(12) United States Patent
Unterlander et al.

(10) Patent No.: US 7,052,270 B2
(45) Date of Patent: May 30, 2006

(54) POST MOLD COOLING APPARATUS

(75) Inventors: Richard M. Unterlander, Nobleton (CA); Witold Neter, Newnan, GA (US); Zbigniew Romanski, Mississauga (CA); Robin A. Arnott, Alliston (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 11/056,299

(22) Filed: Feb. 14, 2005

(65) Prior Publication Data

US 2005/0142244 A1    Jun. 30, 2005

Related U.S. Application Data

(60) Division of application No. 10/351,596, filed on Jan. 27, 2003, which is a continuation-in-part of application No. 10/147,360, filed on May 17, 2002, now Pat. No. 6,817,855.

(51) Int. Cl.
*B29C 45/73*    (2006.01)

(52) U.S. Cl. ............ 425/547; 264/328.14; 264/328.16; 425/572

(58) Field of Classification Search ............... 425/533, 425/574, 575, 576, 547, 572, 566, 150; 264/520, 264/297.8, 328.8, 328.11, 328.14, 334, 328.16
See application file for complete search history.

(56) References Cited

U.S. PATENT DOCUMENTS

| | | | |
|---|---|---|---|
| 4,449,913 A | 5/1984 | Krishnakumar et al. .... | 425/548 |
| 4,729,732 A | 3/1988 | Schad et al. ................ | 425/526 |
| 4,836,767 A | 6/1989 | Schad et al. ................ | 425/552 |
| RE33,237 E | 6/1990 | Delfer, III .................. | 425/547 |
| 4,950,152 A | 8/1990 | Brun, Jr. et al. ............. | 425/533 |
| 5,447,426 A | 9/1995 | Gessner et al. .......... | 425/436 R |
| 5,514,309 A | 5/1996 | Williamson et al. .......... | 264/37 |
| 5,679,306 A | 10/1997 | Nakajima et al. ........... | 264/520 |
| 5,728,409 A | 3/1998 | Schad et al. ................ | 425/130 |

(Continued)

FOREIGN PATENT DOCUMENTS

EP        0 283 644 B2    9/1988

(Continued)

OTHER PUBLICATIONS

"Quad-Ring ®Seal Brochure", Busak & Shamban.

(Continued)

*Primary Examiner*—Tim Heitbrink
(74) *Attorney, Agent, or Firm*—Katten Muchin Rosenman LLP

(57) ABSTRACT

Post mold cooling apparatus and method having transverse movement preferably includes structure and/or steps for cooling a plurality of plastic articles molded on a row of mold cores. A post mold cooling device is provided having (i) a first row of cooling tubes configured to hold a first plurality of the molded plastic articles, and (ii) a second row of cooling tubes configured to hold a second plurality of the molded plastic articles. A cooling station is disposed adjacent the cooling device and is configured to provide a cooling fluid to an interior of both the first and second pluralities of molded articles inside the respective first and second rows of cooling tubes. Movement structure is configured to (i) provide a rotational movement to cause the first and second pluralities of molded articles inside the respective first and second rows of cooling tubes to be presented to the cooling station, and (ii) provide a transverse, axial movement to alternately cause the first row of cooling tubes and then the second row of cooling tubes to be presented to the row of mold cores.

7 Claims, 38 Drawing Sheets

U.S. PATENT DOCUMENTS

| | | | |
|---|---|---|---|
| 5,750,162 A | 5/1998 | Schad et al. | 425/533 |
| 5,817,345 A | 10/1998 | Koch et al. | 425/130 |
| 5,830,404 A | 11/1998 | Schad et al. | 264/297.2 |
| 6,059,557 A | 5/2000 | Ing et al. | 425/552 |
| 6,113,834 A | 9/2000 | Kozai et al. | 264/335 |
| 6,123,538 A | 9/2000 | Kutalowski | 425/552 |
| 6,143,225 A | 11/2000 | Domodossola et al. | 264/237 |
| 6,171,541 B1 | 1/2001 | Neter et al. | 264/328.14 |
| 2003/0214079 A1* | 11/2003 | Unterlander et al. | 425/547 |

FOREIGN PATENT DOCUMENTS

| | | |
|---|---|---|
| EP | 0 749 045 A1 | 9/1997 |
| EP | 1 013 398 A1 | 6/2000 |
| EP | 0 900 135 B1 | 11/2000 |
| WO | WO 97/39874 | 10/1997 |

OTHER PUBLICATIONS

"Kantseal Brochure", Busak & Shamban.

\* cited by examiner

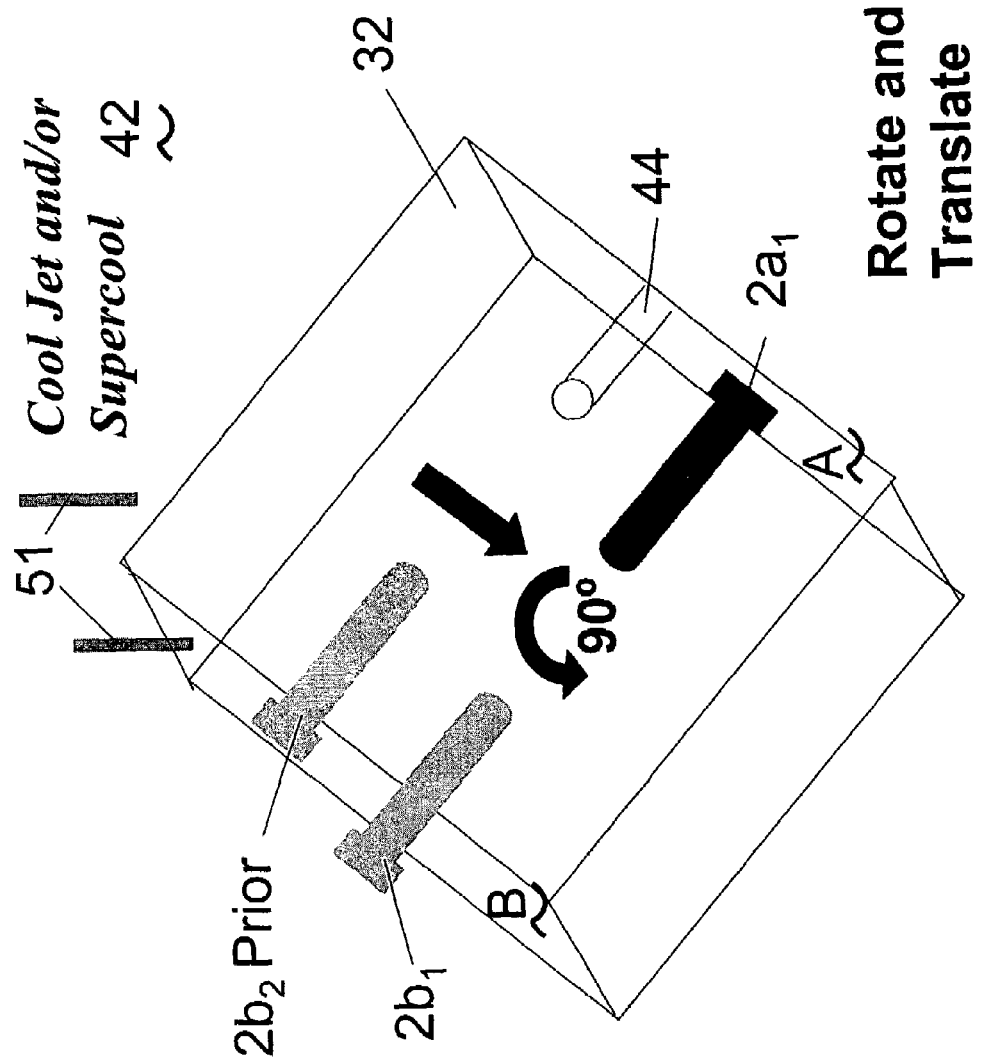

US 7,052,270 B2

POST MOLD COOLING APPARATUS

This is a divisional of application Ser. No. 10/351,596, filed Jan. 27, 2003, which is a continuation-in-part of application Ser. No. 10/147,360, filed May 17, 2002 now U.S. Pat. No. 6,817,855. The entire text of the above-referenced disclosure is specifically incorporated by reference herein without disclaimer.

BACKGROUND OF THE INVENTION

1. Field of the Invention

The present invention relates to a method and apparatus for cooling molded plastic articles after molding is finished. In particular, the present invention relates to method and apparatus for a post mold cooling ("PMC") device having at least two opposed faces. The method and apparatus are particularly well suited for cooling injection molded thermoplastic polyester polymer materials such as polyethylene terephthalate ("PET") preforms.

2. Related Art

A variety of post mold cooling methods are currently employed on injection molding machines (e.g., an Index machine platform) in various sequences to optimize the cooling of freshly molded plastic parts. Some parts (for example plastic preforms) are typically injection-molded using PET resin, and can have wall thicknesses varying from about 2.00 mm to greater than 4.00 mm, and consequently require extended cooling periods to solidify into substantially defect-free parts. Heavy walled parts (such as those made from a material that has a high resistance to thermal heat transfer, like plastic resin) can exhibit "reheating" phenomena that can produce defective parts after they have been ejected from the mold.

In the case of PET preforms some of these manufacturing defects are:

Crystallinity: The resin recrystallizes due to the elevated temperature of the core resin not cooling quickly enough. The white appearance of the crystals impairs the clarity of the final product and provides an area of potentially weakness in a resultant blown product.

Surface blemishes: The ejected performs, initially having solidified surfaces are reheated by the core material which causes the surface to soften and be easily marred. Sometimes this surface reheating can be severe enough to cause touching parts to weld together.

Geometric inaccuracies: Handling partly-cooled performs or attempting to further cool them in devices that do not maintain their geometric shape while their surfaces are reheated can cause the preform's round diameter to become oval shaped or the smooth surface to become wrinkled or non-linear.

The above-noted problems could be alleviated somewhat by extending the cooling time of the injection molded performs in their mold. However, this will cause the injection molding cycle to be lengthy, typically 25 seconds or longer, wherein the majority of this time was used solely for cooling purposes. In an effort to improve the production efficiency of this process, several techniques are employed to perform a post mold cooling function, wherein partially cooled preforms are ejected from the injection mold after an initially cooled surface skin has formed to allow the part to be ejected without deformation. The partially cooled preforms are then handed off to a downstream device that continues to hold the preform while removing the remaining heat so that the preform can subsequently be handled without damage. Typically, the preform surface temperature needs to be lowered to about 70° C. to ensure safe handling.

The early ejection of partially cooled preforms released the injection molding equipment earlier in the molding cycle, thereby significantly improving the production efficiency of the equipment. Injection molding cycle times typically were halved from 25 seconds to about 12 seconds or less in some instances depending on the preform design being molded.

Some examples of post mold cooling technology are shown in U.S. Pat. Nos.: 4,729,732; Re. 33,237; 5,447,426; and 6,171,541.

Another approach to extending the cooling time for preforms is to utilize a turret molding machine in which more than one set of injection molding cores are employed. An example is the Index machine, shown in U.S. Pat. Nos.: 5,728,409; 5,830,404; 5,750,162; and 5,817,345, which disclose using a turret block having four faces and four core sets that are sequentially mated with one cavity set to hold the injection mold preforms. Preforms molded on this kind of equipment can be produced in molding cycle times of typically 10–13 seconds.

In Index machines with fewer core side tooling sets employed, additional post mold cooling devices are used to complete the preform cooling and maintain cycle time benefits. Examples of Index machines with post mold cooling devices are shown in U.S. Pat. Nos. 6,059,557; 6,123, 538; 6,143,225; and 6,113,834.

One technique for improving the rate of heat transfer from a cooling preform is to pressurize its interior volume while cooling it in a cavity. This method helps keep the preform's exterior surface in contact with the cooling cavity surface, and counters the shrinkage of the preform that tends to separate the two surfaces. This allows good heat transfer to be maintained. Examples of pressurized preform cooling are shown in U.S. Pat. Nos. 4,950,152; and 5,679,306, and in EP 0 900 135.

U.S. Pat. No. 6,113,834 to Kozai discloses a post mold cooling device (PMC) that unloads preforms from an Index preform molding machine into cooling tubes. FIGS. 8–14 disclose mounting multiple sets of tubes on a single plate so that multiple molding sets of preforms can be cooled by the tubes during several injection molding cycles, thereby extending the cooling time of each preform during its stay in the PMC device. This patent also discloses blowing a cooling fluid from the PMC device onto the exposed gate area of the freshly molded preforms while they are still on the injection molding cores prior to their transfer to the PMC device. However, this post mold cooling technique is somewhat limited by the absence of a more efficient means to cool the interior of the preform. Also, there is no means for efficiently translating the turret to access the various sets of cooling tubes.

Therefore, there is a need for a post-mold cooling method and apparatus, which provides rapid, efficient cooling while further reducing the molding cycle time to further decrease the cost of producing molded plastic pieces.

SUMMARY OF THE INVENTION

According to a first aspect of the present invention, structure and/or steps are provided for cooling a plurality of plastic articles molded on a plurality of mold portions. A cooling device is provided having (i) a first plurality of cooling structures configured to hold a first plurality of molded plastic articles, and (ii) a second plurality of cooling structures configured to hold a second plurality of molded plastic articles. A cooling station is disposed adjacent the cooling device and configured to provide a cooling fluid to an interior of the first and second pluralities of molded articles inside the respective first and second pluralities of cooling structures. A movement structure is provided and is configured to (i) provide a first movement to cause relative movement of the cooling device and the mold portions to cause the first and second pluralities of molded articles inside the respective first and second pluralities of cooling structures to be presented to the cooling station, and (ii) provide a second movement, different from the first movement, to alternately cause the first plurality of cooling structures and then the second plurality of cooling structures to be presented to the plurality of mold portions. Each face preferably mounts cooling tubes in multiple sets. The preferred embodiment also has a top mounted CoolJet/Supercool device, and a means for axially moving the cooling block transversely to provide loading of the different cooling tubes sets from an Index preform molding machine.

According to a second aspect of the present invention, structure and/or steps are provided for an injection molding machine, including a mold cavity half having a plurality of mold cavities. A mold core half is provided having a plurality of mold cores corresponding to the plurality of mold cavities. A mold movement structure causes relative movement between the mold cavity half and the mold core half to cause a plurality of molded articles to be extracted from the plurality of mold cavities during each of a plurality of mold cycles. A cooling device is movable with respect to the mold core half and has a plurality of cooling tubes to hold the plurality of molded articles extracted from the plurality of mold cavities. A cooling device movement structure is coupled to the cooling device and is configured to maintain the plurality of molded articles in the plurality of cooling tubes for a time period exceeding two of the mold cycles.

According to a third aspect of the present invention, structure and/or steps are provided for moving a cooling turret with respect to a plastic injection molding machine portion. Linear movement structure is configured to cause the cooling turret and the plastic injection molding machine portion to move relatively toward and away from each other. Rotary movement structure is configured to cause relative rotational movement between the cooling turret and the plastic injection molding machine portion. Axial movement structure is configured to cause relative axial movement between the cooling turret and the plastic injection molding machine portion.

According to a fourth aspect of the present invention, structure and/or steps are provided for a cooling apparatus for a plastic injection molding machine having a plurality of mold cores disposed in at least one row. A post mold cooling device is provided and is moveable with respect to the plurality of mold cores. A rotatable cooling turret is coupled to the post mold cooling device and has two faces, each face having at least first and second rows of cooling tubes. A cooling station is coupled to the post mold cooling device and has a plurality of cooling probes configured to project a cooling fluid to an interior of molded articles inside both the first and second rows of cooling tubes of one of the faces of the cooling turret. A first movement structure is configured to cause the post mold cooling device to move toward and away from the plurality of mold cores. A second movement structure is configured to cause the cooling station to move toward and away from the cooling turret. A third movement structure is configured to cause the cooling turret to rotate to alternately present the first and second cooling turret faces to the cooling station. A fourth movement structure is configured to cause the cooling turret to move axially with respect to its axis of rotation to alternately present the first row of cooling tubes and then the second rows of cooling tubes of a cooling turret face to the row of mold cores.

According to a fifth aspect of the present invention, structure and/or steps are provided for cooling a row of molded articles disposed on a row of mold cores. The row of molded articles is transferred to a first row of cooling tubes disposed on a cooling device. The row of molded articles in the first row of cooling tubes is moved to a cooling station. At the cooling station, a cooling fluid is injected into the interior of each molded article in the row of molded articles. The row of molded articles is moved to a position away from the cooling station. The row of molded articles is then moved back to the cooling station. At the cooling station, once again, a cooling fluid is injected into the interior of each molded article in the row of molded articles. Finally, the row of molded articles is moved to an ejection station.

Thus, the present invention advantageously provides post-mold cooling method and apparatus for efficiently cooling molded plastic pieces.

BRIEF DESCRIPTION OF THE DRAWINGS

Exemplary embodiments of the present invention will now be described with reference to the accompanying drawings in which.

DETAILED DESCRIPTION OF THE PRESENTLY PREFERRED EXEMPLARY EMBODIMENTS

1. Introduction

The present invention will now be described with respect to several embodiments in which an Index plastic injection molding machine uses a (preferably rotating) take out turret to extract plastic preforms from a molding unit, and sequentially to move these preforms to a cooling station. Preferably, the cooling station comprises a so-called CoolJet™ device in which a cooling pin is inserted into each preform, cooling air is injected to the interior tip of the preform, and the cooling air flows down the inside surface of the preform to the outside. The cooling station may also comprise a so-called SuperCool device in which a cooling pin is inserted into each preform, each preform is pressure-sealed, and cooling air is injected into the interior of the preform. The pressure causes the outside walls of the preform to contact the inside walls of the take out cavity, thus effecting cooling on both the inside and outside surfaces of the preform. The cooling station may also comprise a combination of CoolJet™ and SuperCool devices and/or equivalent structures. Nevertheless, it should be understood that the teachings and claims of the subject invention are equally applicable to other molding processes used for producing other relatively thick-walled hollow articles. For example, the present invention will find applicability in many molding technologies beyond injected-molded plastic preforms, such as the molding of containers, pails, trays, paint cans, tote boxes, and similar products, or other molded products possibly with non-circular cross-sectional shapes, etc.

2. The Structure

Figure 1:
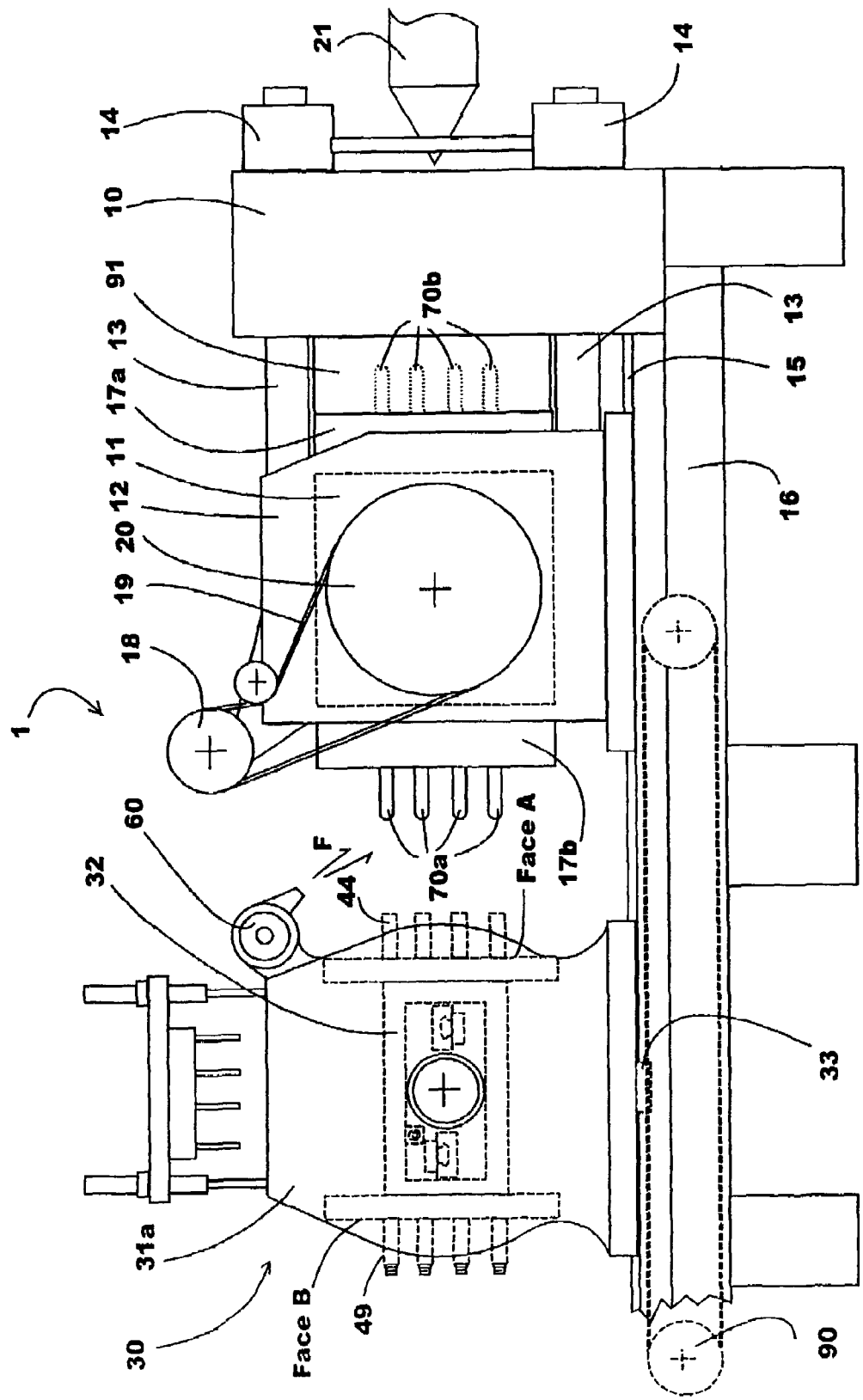
FIG. 1 is a schematic side view of the clamp half of an Index preform molding machine including a PMC device according to a preferred embodiment of the present invention.

FIG. 1 shows the clamp half of an Index preform molding machine 1 comprising the stationary platen 10 and a rotating turret block assembly 11. The turret block assembly 11 is mounted on journals and is typically carried by two carriers 12 which are releasably connected to the stationary platen 10 by tiebars 13. The ends of the tiebars are releasably connected to clamping piston assemblies 14 mounted to the stationary platen 10. The carriers 12 are guided and slide on linear bearings 15 attached to the machine base 16. The carriers 12 and the molding turret block assembly 11 are moved toward and away from the stationary platen 10 by well-known drive means (not shown). Preform mold half 91 (comprising a hot runner and mold cavities) is mounted to the stationary platen 10 and sequentially engages one or more mold cold halves 17a and 17b that are mounted to the opposed faces of the molding turret block assembly 11. When the mold halves are separated by moving the carriers away from the stationary platen, the molding turret block assembly 11 and the attached mold cold halves 17 can be rotated, for example, by a servo motor 18 via a drive belt 19 and a pulley 20. An injection unit 21 supplies melted resin for injection into the mold.

A post mold cooling (PMC) device or assembly 30 includes a second pair of carriers 31a and 31b that also are guided and slide on linear bearings 15 attached to the machine base 16. A cooling turret block 32 is mounted between the carriers 31a and 31b, and is rotatable therebetween. The PMC device 30 is movable along the machine base typically through use of a motor drive 90 and a belt 33 such that the assembly can move toward or away from the molding turret block assembly 11.

Figure 2:
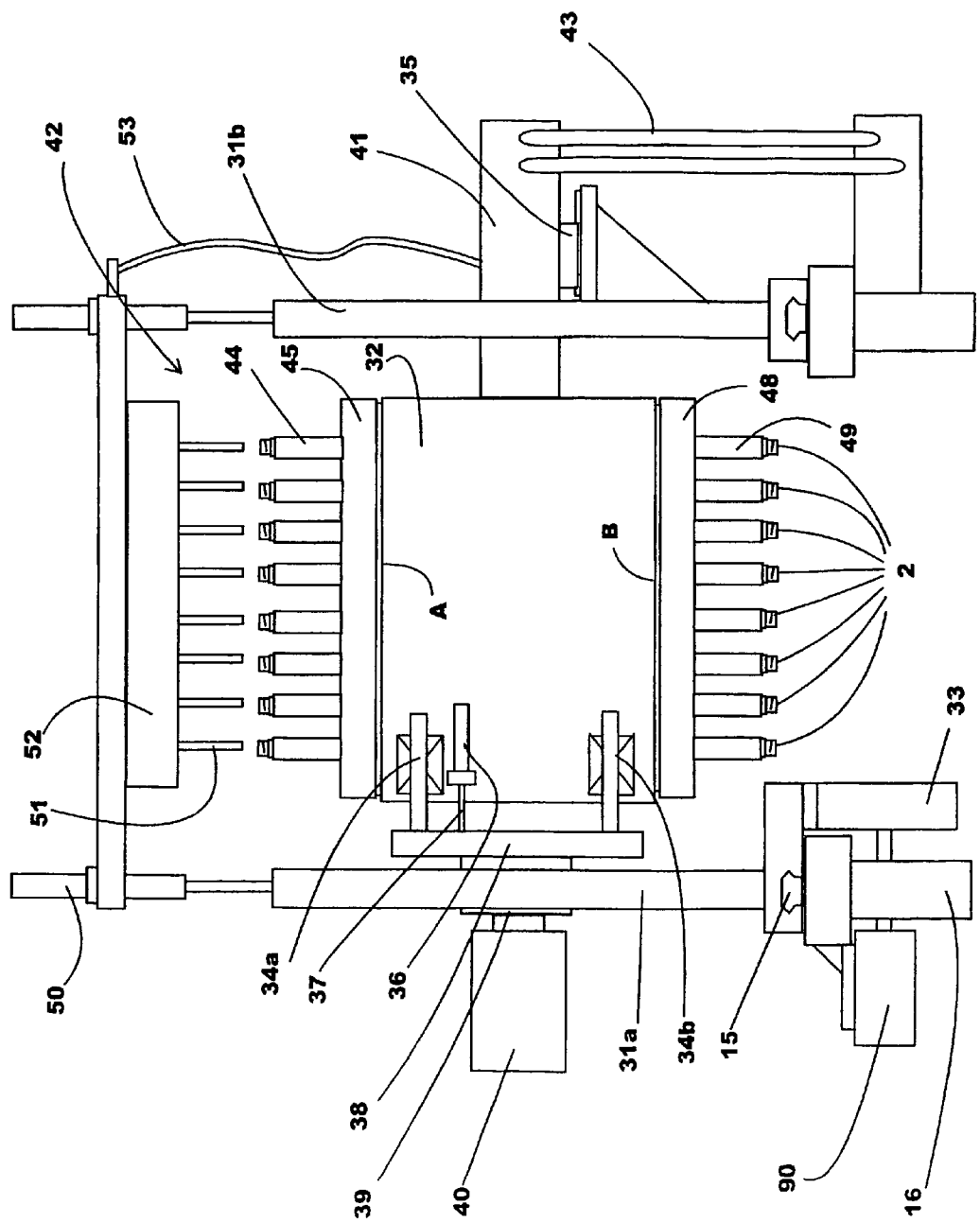
FIG. 2 is a schematic front view of the PMC device of FIG. 1 prior to unloading and insertion of a CoolJet™/Supercool device.

FIG. 2 shows a front view of the PMC device in its unloading orientation. The cooling turret block 32 is carried on linear bearings 34a and 34b and 35 such that it can move transversely along its axis of rotation or substantially parallel to its axis of rotation between the carriers 31a and 31b. This motion may be caused by a cylinder 36 that is mounted on the cooling turret block 32. A cylinder rod 37 is attached to a bearing arm 38 that also carries part of the linear bearing assemblies 34a and 34b. The bearing arm 38 is journaled in the carrier 31a, and is attached via a gearbox 39 to a servo drive motor 40 that causes the arm 38 and the cooling turret block assembly 32 to rotate. The opposed end of the cooling turret block 32 is supported by a rotary services union 41 that is itself supported on a bearing assembly 35 such that the transverse motion of the cooling turret block 32 is guided along the bearing 35 to an outboard position shown in FIG. 4. The amount of this motion is determined by the pitch between the multiple rows of cooling tubes mounted on the PMC mounting plates, to be described below.

The rotary services union 41 provides a rotary connection for pneumatic, hydraulic, cooling fluid, and electrical services from the machine base to both the cooling turret block 32 and the CoolJet™/Supercool assembly 42 (to be described below) mounted on top of the carriers 31a and 31b. These services are conveyed via flexible conduits 43 from the base 16 to the union 41 so that the supply can be maintained regardless of the position of the PMC on the machine base 16.

FIG. 2 also shows the preform cooling tubes 44 mounted on a plate 45. There are sufficient tubes 44 for multiple sets of preforms 2 being molded by the injection unit. In the illustration there are 32 tubes mounted on plate 45, these being sufficient for two molding sets produced by an exemplary 16 cavity injection mold. Of course, a set may comprise any number of tubes greater than or equal to two. Further, there may be two, three, or more sets of tubes coupled to the plate 45. A plate 45 is mounted on one side, face A, of the cooling turret block 32. A second plate 48 and corresponding tubes 49 (32 in number) are mounted on the opposed face B of the cooling block 32. The tubes are arranged in two alternate sets on each face (e.g., see FIG. 4), each set matching the pitch of the injection mold cores. The first set aligning with the mold is called row 1 and the second set offset from row 1 by an amount X is called row 2. If sufficient space allows, additional sets may be provided on each face.

In the present embodiment the total number of tubes on both sides of the cooling turret block 32 can hold four sets of parts molded by the injection unit, thus parts can be treated for four cycles after ejection from the molding turret 11. Clearly if there is space for additional tubes, an extended treatment time can be provided. Further, depending on the design, the parts may be treated for two, three, four, or more molding cycles. Further, cooling turret block 32 could have more than two faces for mounting sets of tubes.

Figure 13:
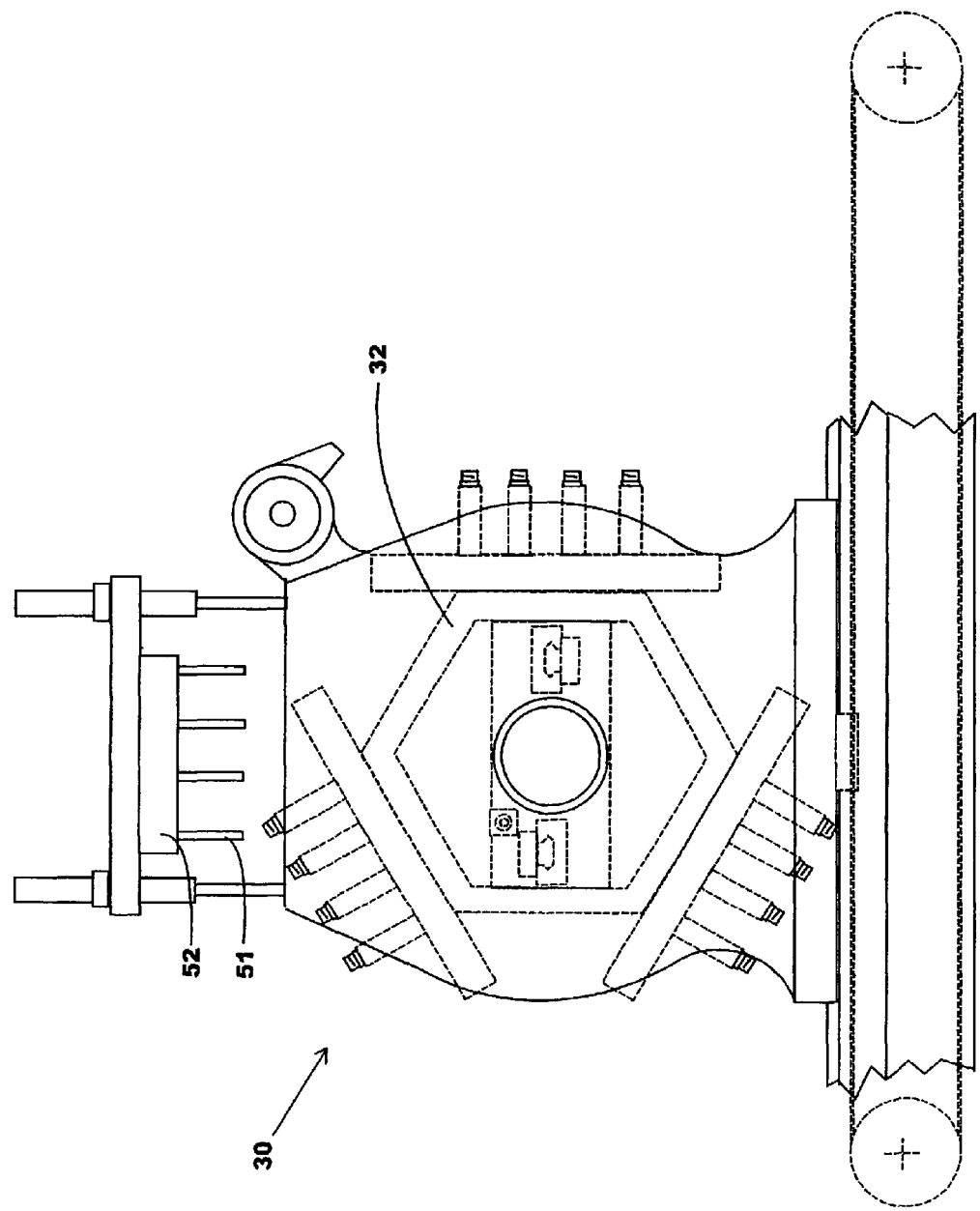
FIG. 13 is a schematic side view of an alternate embodiment of the PMC device showing three faces.
Figure 14:
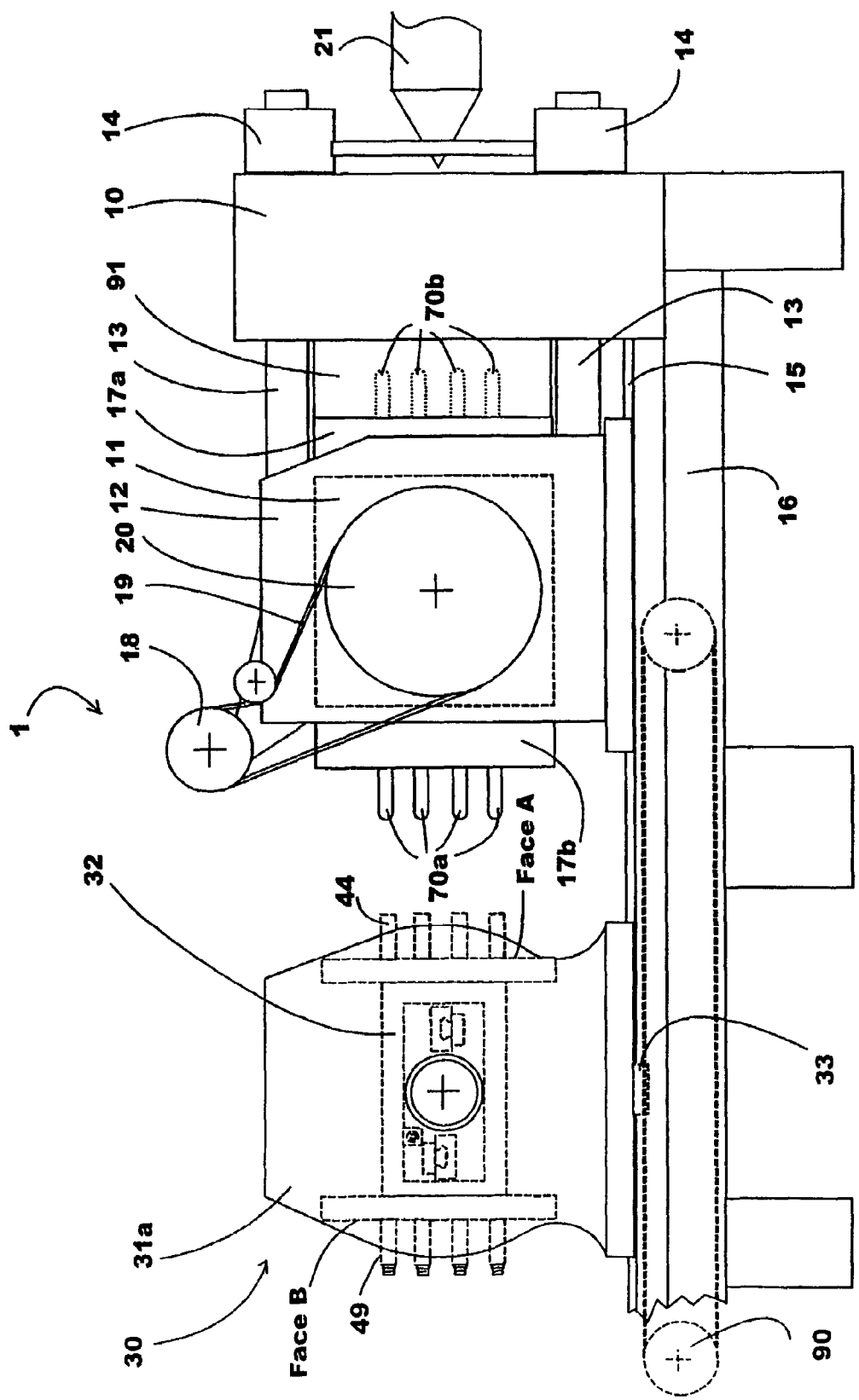
FIG. 14 is a schematic side view of a further alternate embodiment of the PMC device without a cooling station or blower.

FIG. 13 shows an alternate embodiment mounting three such plates, others mounting four or more are also possible. Further, there are situations where the parts being molded are thin enough not to require internal cooling by means of an inserted cooling tube or external cooling by means of a blower. In this situation the machine would be configured as shown in FIG. 14 in which the cooling station atop the carriers 31a and 31b and the blower have been removed.

FIG. 2 also shows the CoolJet/Supercool unit 42 mounted above the cooling turret block 32. The unit is moved vertically by cylinders 50. The unit may comprise only CoolJet™ blowing pins, only SuperCool™ pins for expansion and cooling of the preforms, or a combination of both types in, for example, alternate sets to provide a variety of treatment options to the preforms 2 presented to the unit. The unit includes multiple cooling pins 51, in a number sufficient to match the corresponding number of cooling tubes 44 on one face of the cooling turret block 32. In the preferred embodiment, there are 32 cooling pins mounted in a matrix matching the corresponding tubes 44. The cooling pins 51 are mounted on a distributor plate 52 that provides pressurized and/or nonpressurized coolant flow to each cooling pin. Alternatively, this plate 52 may simply be a plenum, pressurized by a blower mounted on the unit 42 (not shown). If pressurized cooling fluid (liquid and/or gas) is supplied to the distributor plate 52, it is conveyed by a flexible conduit 53 that connects the plate 52 to the services union 41 or an alternate point on the PMC device 30.

FIG. 1 also shows a blower 60 mounted on the PMC device 30 that can direct a flow of air toward the molded parts while they are still on their cores 70a on the molding turret 11, as indicated by arrows F. This allows supplementary cooling of the parts (especially their gate areas) while they are waiting to be transferred to the PMC device 30. For clarity, the blower 60 is omitted from the views of the PMC device 30 in other figures. An alternate embodiment (not shown) mounts one or more blowers on the cooling turret block 32 or on the carriers 31a and 31b such that they are closer to the parts on the cores onto which they are directing their air flow and from such a location that optimizes the flow distribution evenly over the matrix of injection cores on the index block when in the transfer position, as shown in FIG. 1. A further alternate embodiment (not shown) mounts the blowers on the machine base and ducts, mounted on the carriers 31a and 31b, align with the blowers when the PMC device is in the transfer position, so to direct the flow distribution evenly over the matrix of injection cores on the index block when in the transfer position, as shown in FIG. 1. While the turrets 11 and 32 are configured for rotary movement, alternative embodiments include molding and/or cooling plates which may be moved linearly or curvelinearly with respect to the mold and the molding/cooling structures, as may be required.

3. The Process

In operation, the Index molding turret block 11 and the mold cold half 17a are moved to form a closed mold with a hot mold half 91. A clamp force is applied to the mold via, in the preferred embodiment, clamp pistons 14 acting through tiebars 13. The mold is filled by the injection unit 21, and after a hold and cooling time, the mold is opened by moving the molding turret 11 and the cold half 17a away from the stationary platen 10 a sufficient distance to clear the rotational arc of the cores 70a on the molding turret 11. In a two faced turret system the turret block is rotated through 180 degrees to align the first set of mold cores 70a carrying the freshly molded parts thereon with the PMC device cooling tubes 44. The second set of mold cores 70b are now aligned with the cavity half 91 the mold is closed, and the cycle repeated to make a second set of parts on the second set of cores 70b. A typical injection molding cycle time is about 10 seconds.

Meanwhile, the blower 60 directs a cooling flow of air onto the parts on the cores 70a. Just before the molding cycle taking place on cores 70b is completed, the PMC device 30 is moved toward the molding turret 11, and the molded parts on cores 70a are transferred from the injection molding turret 11 to row 1 of the cooling tubes 44 mounted on face A of the cooling turret block 32 of the PMC device 30. The PMC device 30 is then moved away from the molding turret 11 a sufficient distance to clear the rotational arc of the cooling tubes 44 when loaded with preforms.

Figure 3:
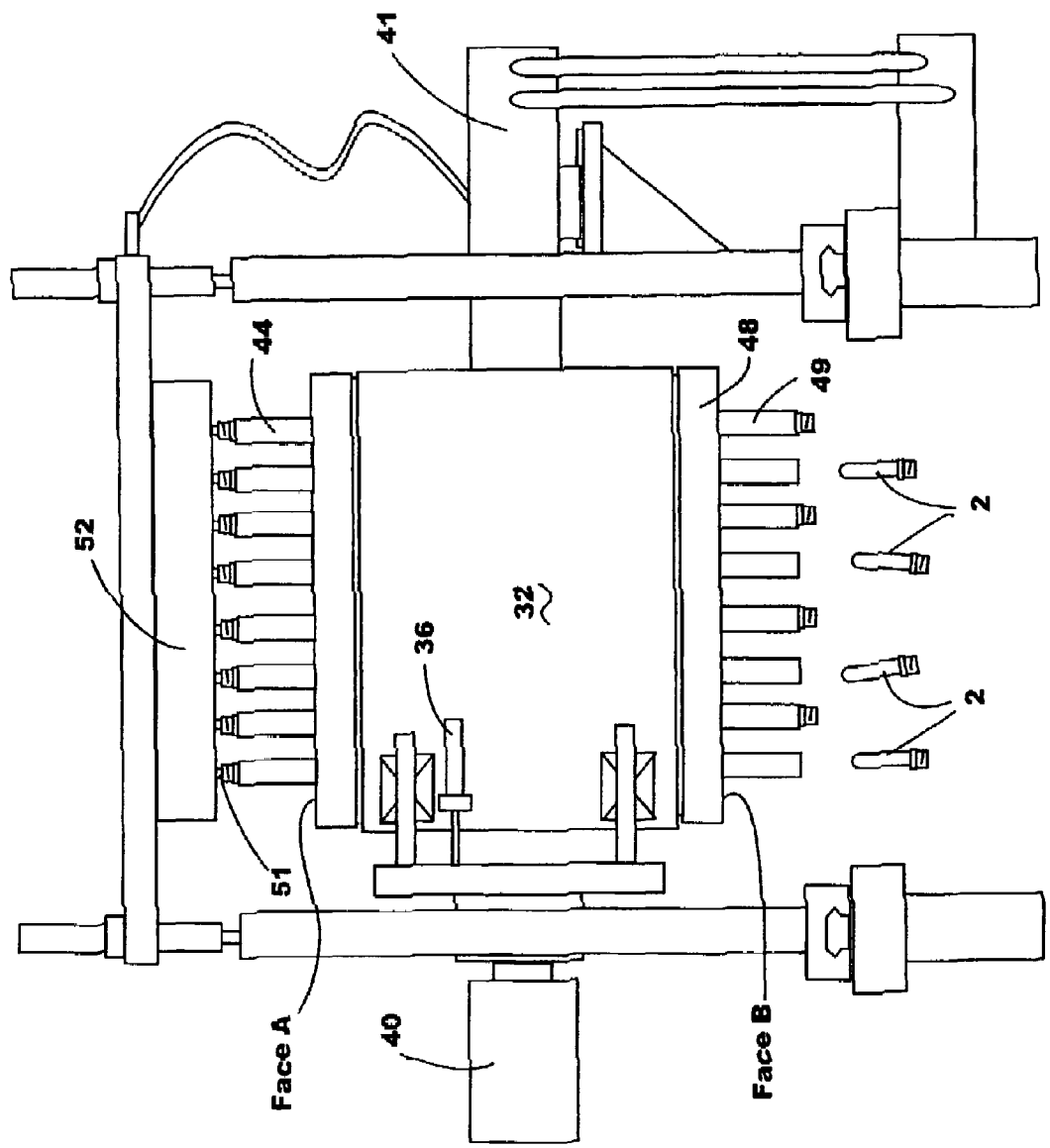
FIG. 3 is a schematic front view of the PMC device of FIG. 1 unloading selected parts and with the CoolJet™/Supercool device in conditioning position.

The cooling turret block 32 is then rotated through 90 degrees to align the tubes and their parts vertically with the CoolJet™/Supercool unit 42, as shown in FIG. 2. This unit is then moved via cylinders 50 downwards to insert cooling pins 51 into all the preforms in all the tubes 44, and cooling fluid is ejected from the tubes to cool the interior of the parts. The interior of the parts may be pressurized and/or the cooling fluid may be directed to a distal tip of the interior of the part. Meanwhile, as shown in FIG. 3, some of the parts 2 in the tubes 49 mounted on the opposed face B of the cooling turret block 32 are ejected beneath the cooling block onto a conveyor (not shown). The ejected parts have thus been traveling in the PMC device 30 for four or more molding cycles depending on the number of cooling tube sets installed on the PMC and the number of faces utilized to support cooling tubes. For a 10 second injection molding cycle time the parts will have been treated in the PMC unit for approximately 40 seconds.

In the preferred embodiment, photo eye sensors (not shown) mounted on the inboard surfaces of the carriers 31a and 31b and aligned with reflectors (not shown) mounted on the cooling turret block 32 faces A and B check to ensure the appropriate parts 2 have been completely ejected from the cooling tubes and that any auxiliary ejector bars (not shown) have correctly retracted prior to rotation of the turret block 32 thereby ensuring the risk of equipment collision is avoided. An alternate part removal embodiment is by use of a conventional robot device (not shown) mounted on the machine base 16 or the adjacent floor having a take-off plate positioned such that parts can be transferred to it when the cooling turret block 32 is in the transfer position shown in FIG. 1 thereby vacating the cooling tubes slightly earlier in the PMC device cooling cycle.

The CoolJet™/Supercool unit 42 is retracted from its inserted position, shown in FIG. 3, by the cylinders 50 a sufficient vertical distance to clear the rotational arc of the cooling tubes 44 and their loaded preforms. The cooling turret block 32 is then rotated 90 degrees to align the vacated tubes with the next set of freshly molded parts on the mold cores 70b. The parts are transferred and the sequence continues. When the next vacated set of tubes occurs that is not aligned with the injection cores, the cooling turret block 32 is moved axially by the cylinder 36 (as the turret rotates) to align the vacated tubes with the next freshly molded parts on the cores 70a. That is, the cooling turret block 32 is moved axially along an axis parallel to that of its rotation to present the next set of cooling tubes to the parts 2 on the turret cores 70a or 70b.

Figure 4:
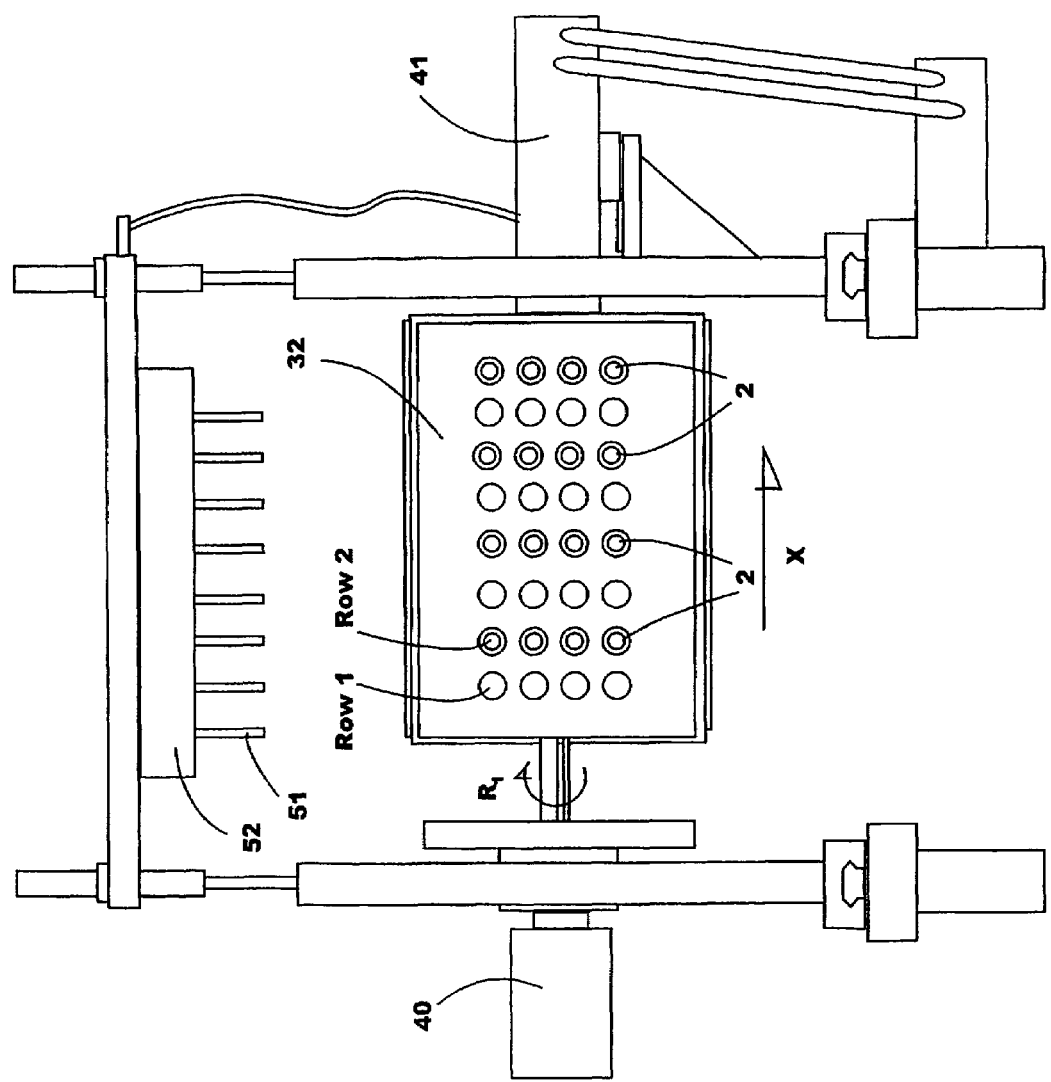
FIG. 4 is a schematic front view of the PMC device of FIG. 1 immediately prior to loading freshly molded preforms into the vacated cooling tubes, showing the transverse motion during rotation of the block.

FIG. 4 shows an arrow X indicating the axial translation of the cooling turret block 32, to align the vacant tubes during the rotary motion of the cooling block, which is indicated by a rotational arrow $R_1$.

Figure 5:
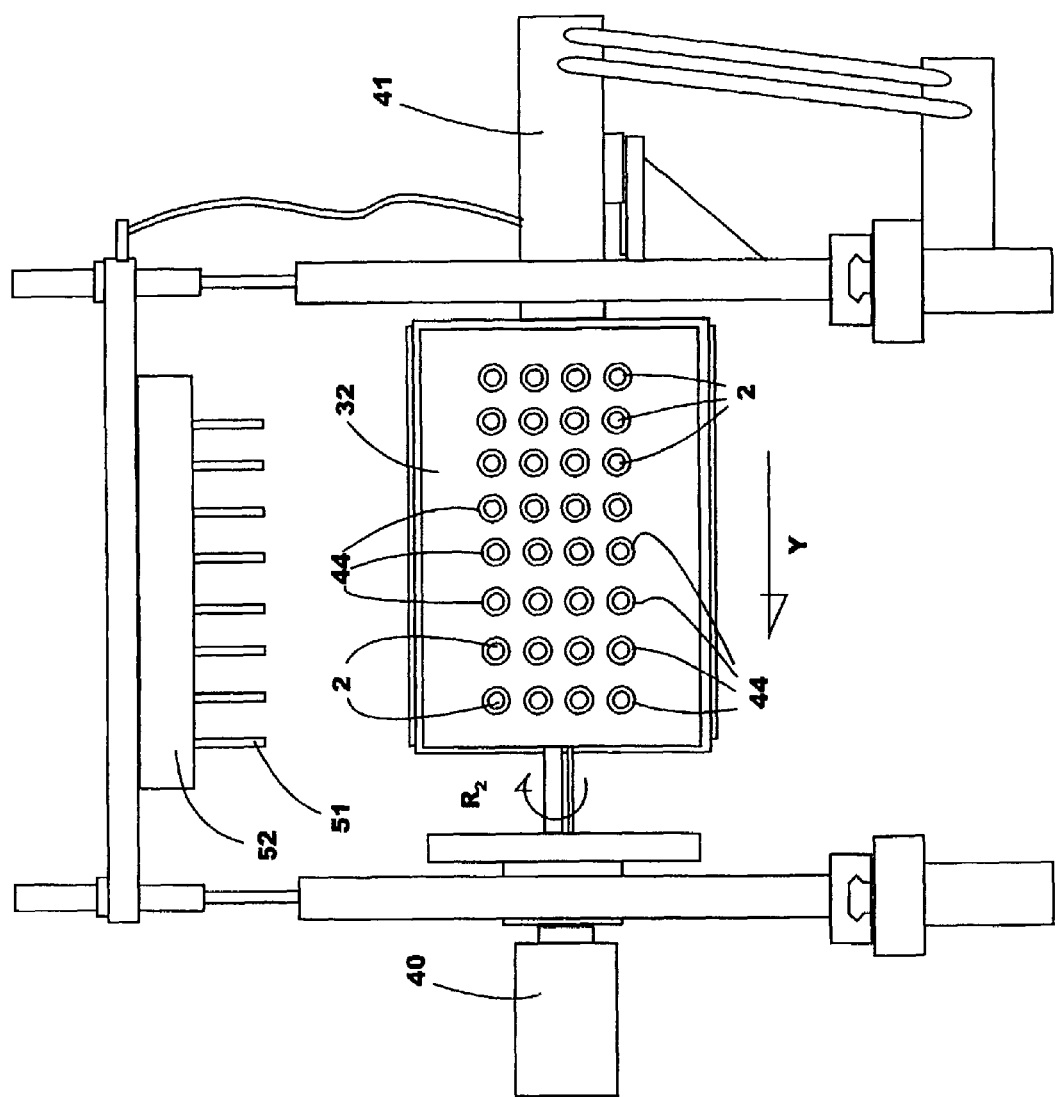
FIG. 5 is a schematic front view of the PMC device of FIG. 4 immediately after loading preforms into the vacated tubes, and shows opposed transverse motion during rotation of the block.

FIG. 5 shows the freshly molded parts 2 loaded into the cooling tubes 44. An arrow Y shows the reverse axial translation of the cooling turret block 32 during the continuing rotation of the cooling block, which is indicated by a rotational arrow $R_2$.

Figure 6:
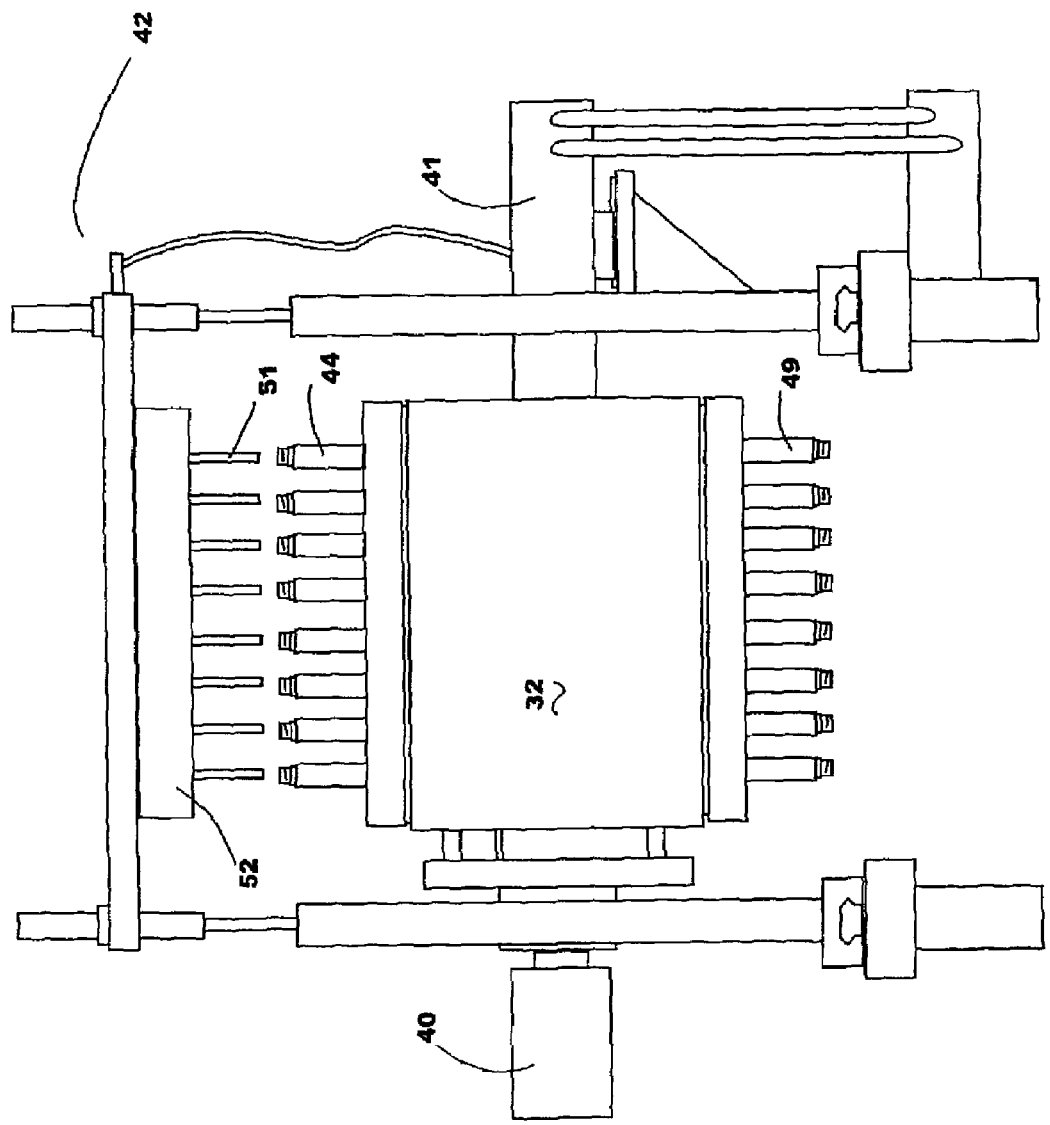
FIG. 6 is a schematic front view of the PMC device prior to unloading and insertion of the CoolJet™/Supercool device.

FIG. 6 shows the continuing sequence with the cooling tubes 44 aligned for treatment by the CoolJet™/Supercool unit 42. Note that at each insertion of the pins 51, all the cooling tubes are loaded with preforms for cooling. Thus, in the entire PMC cycle, each of the preforms preferably has two or more treatments from the CoolJet™/Supercool unit 42. This ensures that any latent migration of residual heat within the wall sections of even the thickest parts of the preform is treated repeatedly, thereby minimizing the opportunity for recrystallization of the resin to occur. Note that a three-sided cooling turret block 32 would result in molded parts being cooled for six molding cycles, and a two-sided cooling turret block would result in molded parts being cooled for four molding cycles. Thus, varying the number of faces on the cooling block will vary the number of injection molding cycles in which the molded parts can be cooled.

Figure 7:
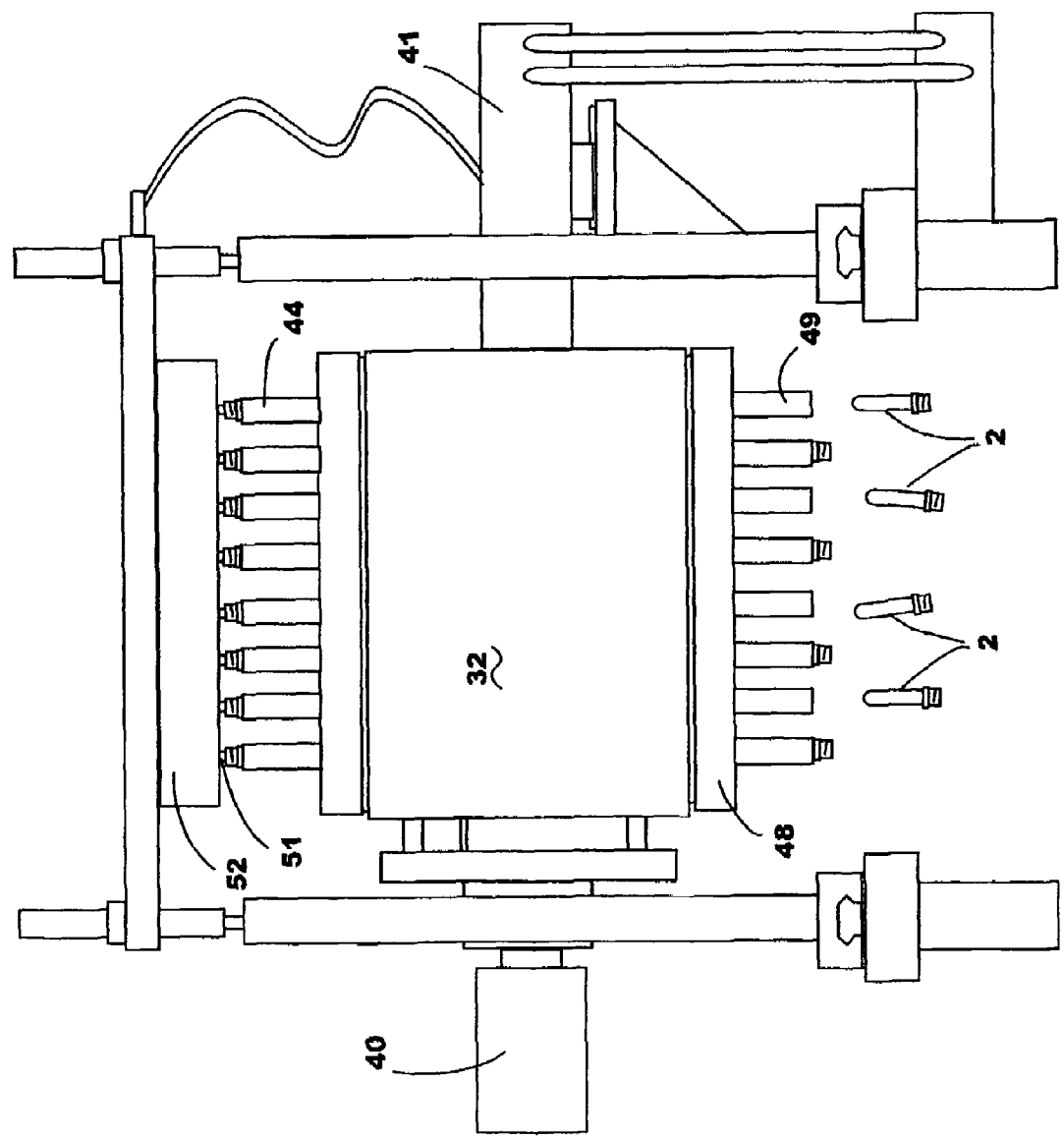
FIG. 7 is a schematic front view of the PMC device unloading selected parts and with the CoolJet™/Supercool device in conditioning position.
Figure 8:
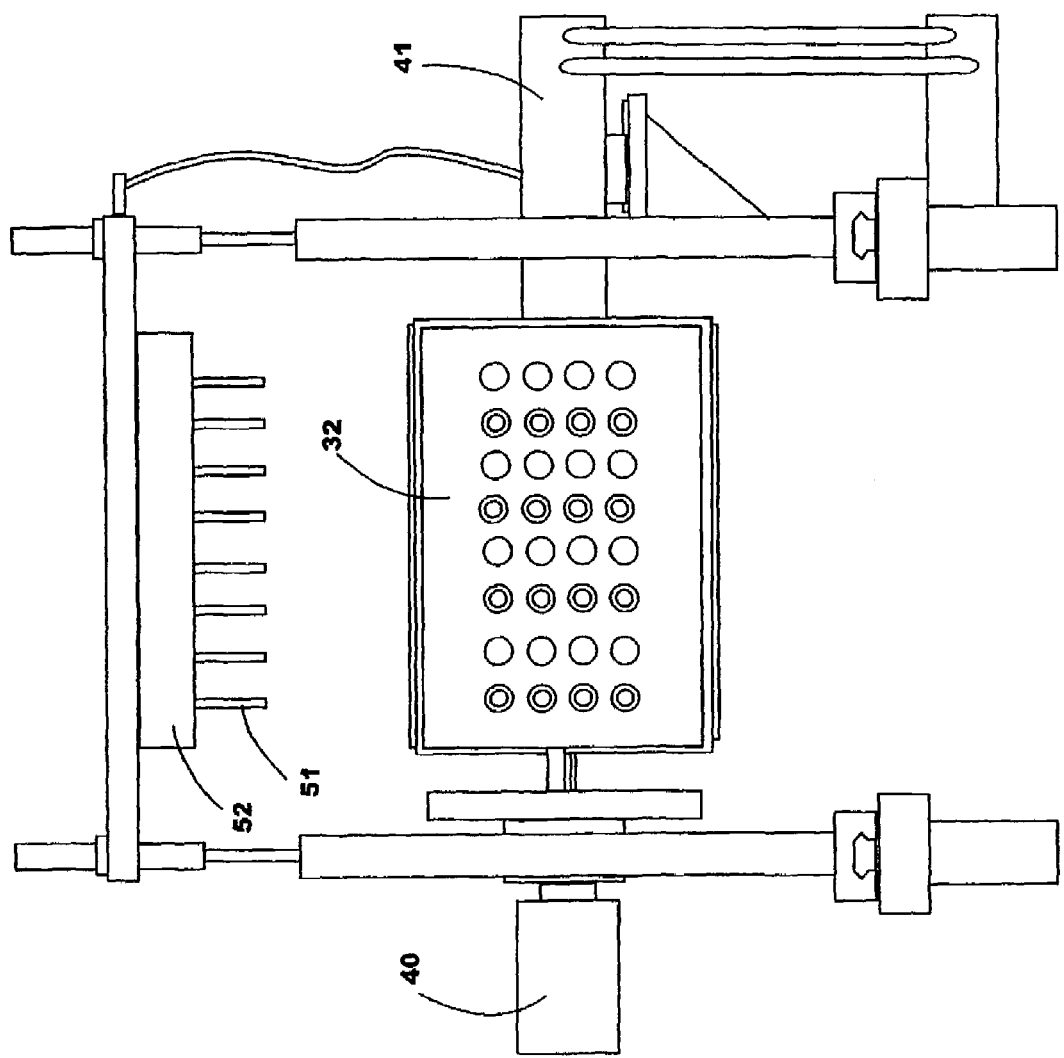
FIG. 8 is a schematic front view of the PMC device immediately prior to loading freshly molded preforms into the vacated cooling tubes.

FIG. 7 shows the ejection of the parts 2 from alternate rows of face A while application of CoolJet™/Supercool treatment is occurring at face B. The sequence continues as shown in FIG. 8 until the parts first loaded into tubes in row 1 face A have been ejected whereupon the sequence recycles. In the case of the preferred embodiment, for each complete cycle of the PMC device 30, four cycles of the injection unit take place. If additional cooling tubes are provided in the PMC device 30, additional molding cycles of the injection unit may be possible. Note that the ejection of the molded parts 2 may be accomplished by mechanical means or pneumatic means, as are well-known in the art.

Figure 9:
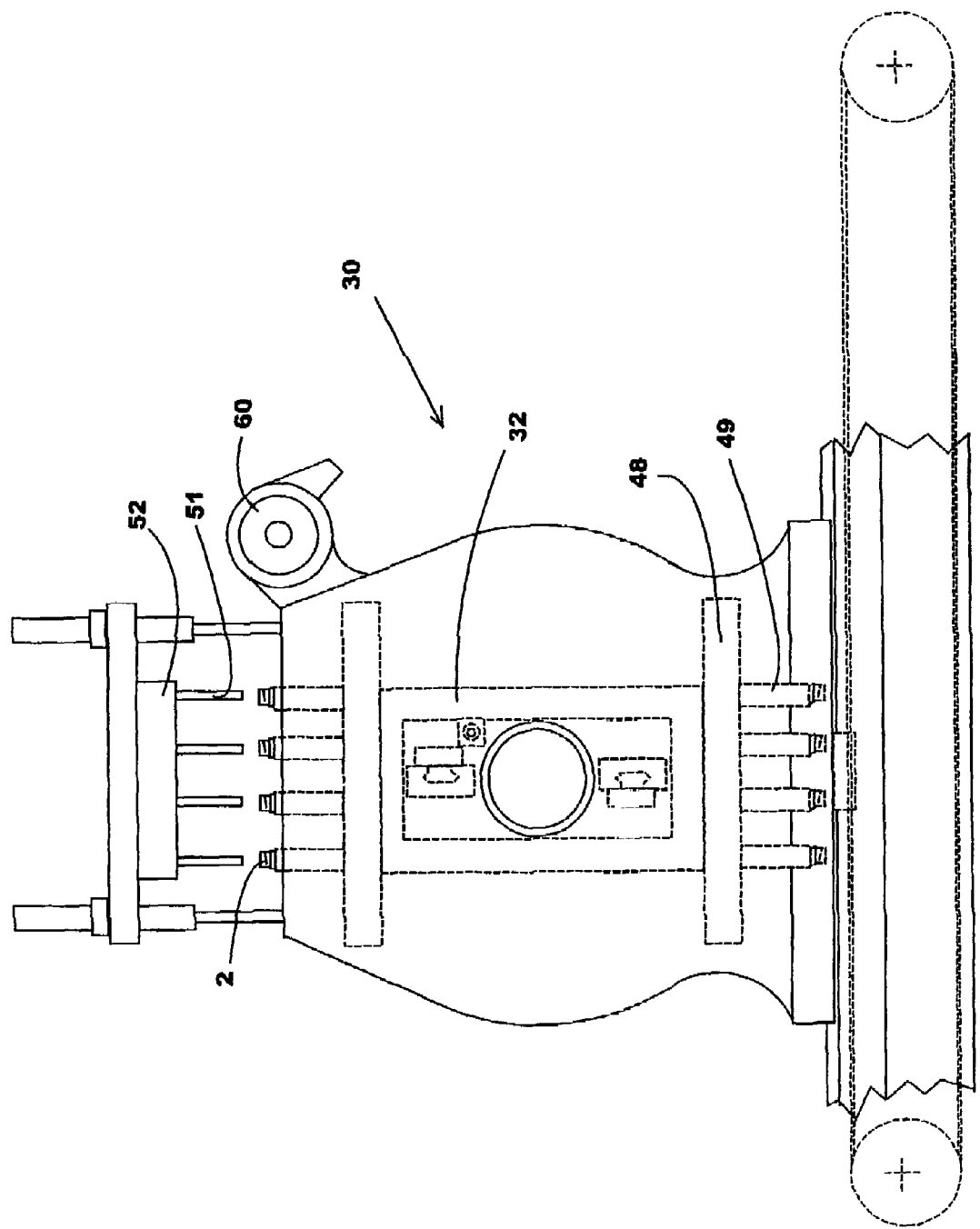
FIG. 9 is a schematic side view of the PMC device prior to unloading and insertion of the CoolJet™/Supercool device.
Figure 10:
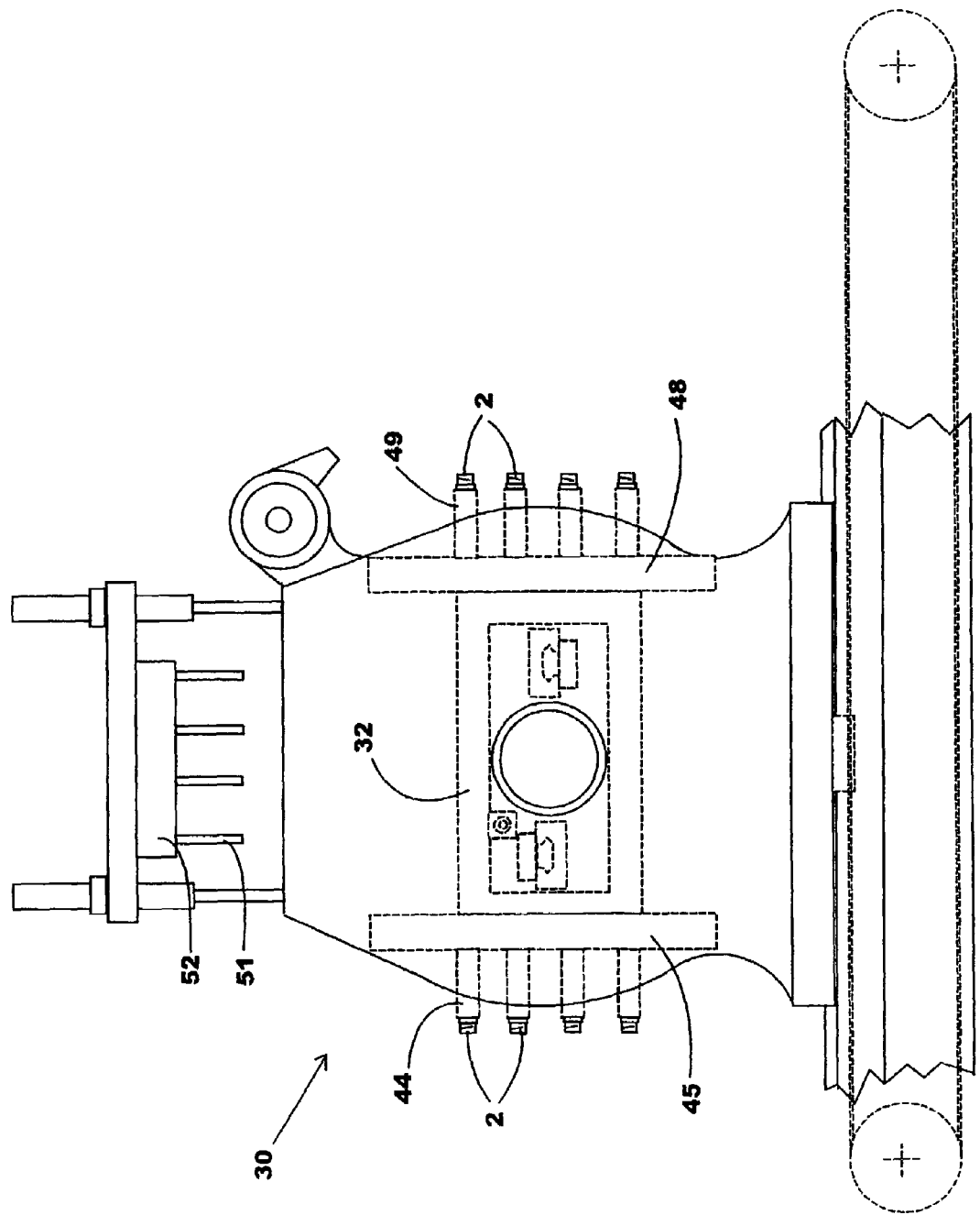
FIG. 10 is a schematic side view of the PMC device immediately after loading preforms into the vacated tubes.

FIG. 9 shows a side view of the PMC device 30 just prior to insertion of the CoolJet™/Supercool cooling pins 51. In FIG. 10, the PMC device 30 has rotated to accept the just-molded preforms 2 into the vacated cooling tubes 49.

Figure 11:
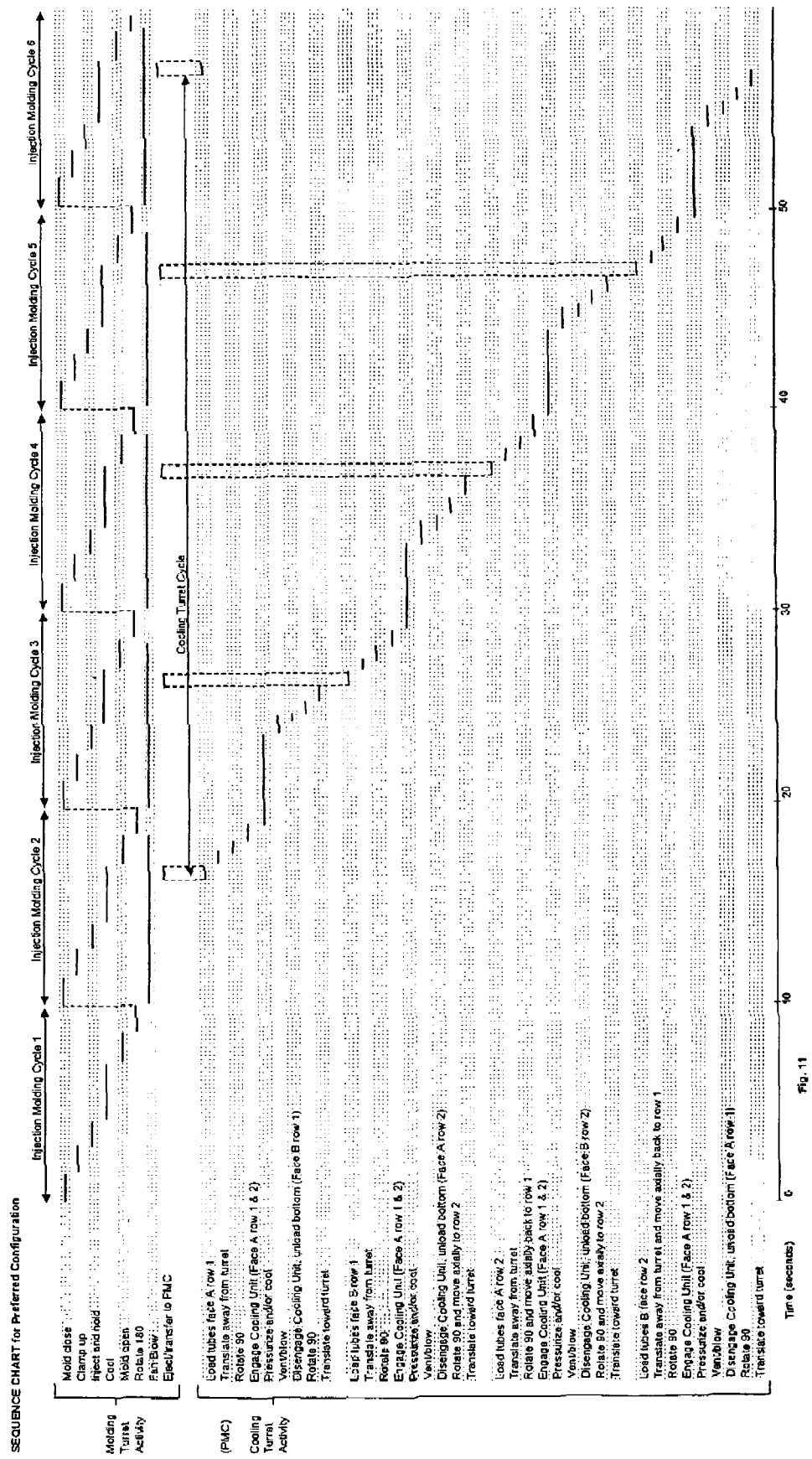
FIG. 11 is a sequence chart showing a complete molding and PMC cooling sequence for one set of preforms.
Figure 12A:
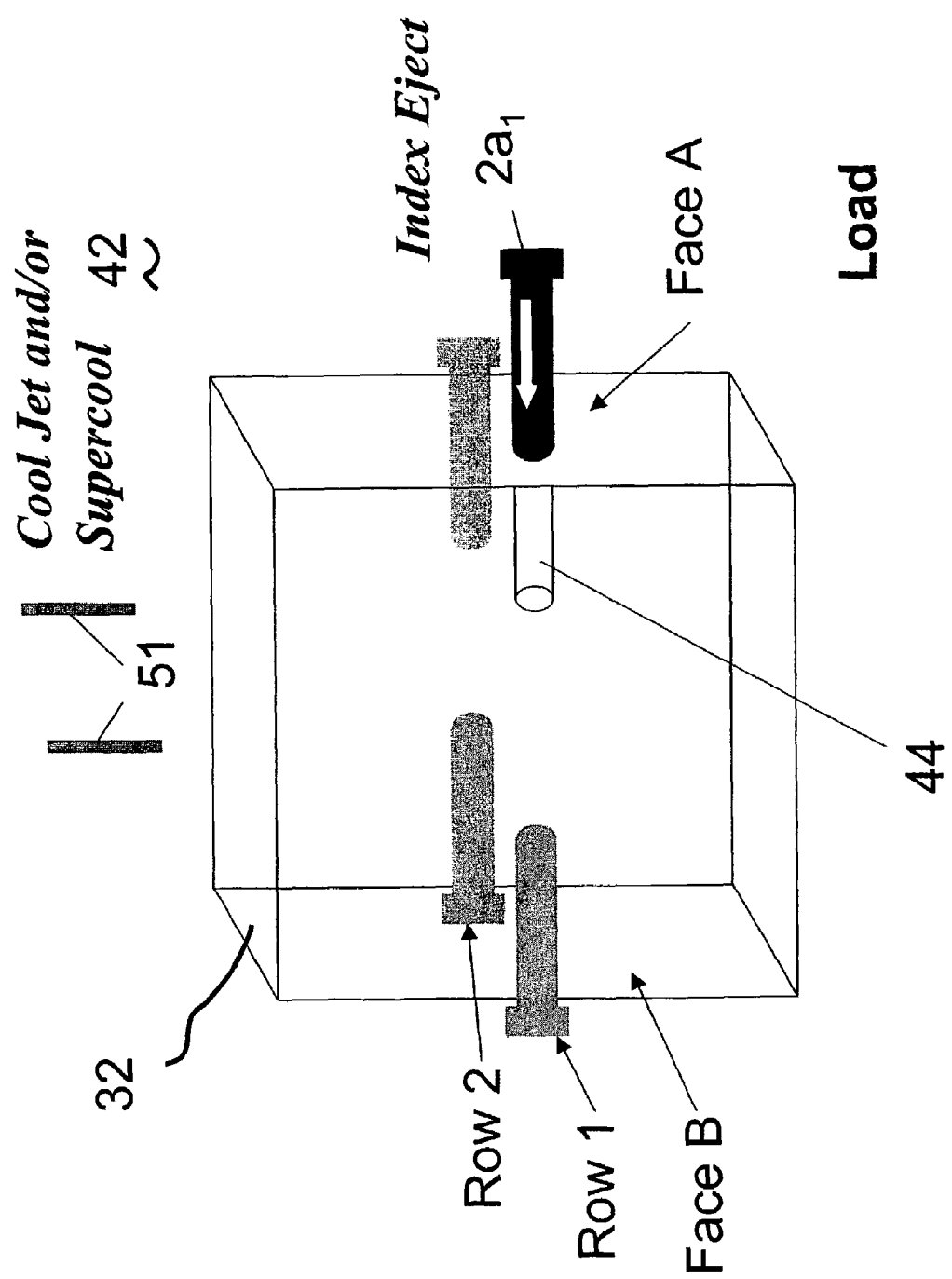
FIGS. 12*a*–12*y* comprise a series of schematic representations of the position of the PMC block for its complete cycle.
Figure 12B:
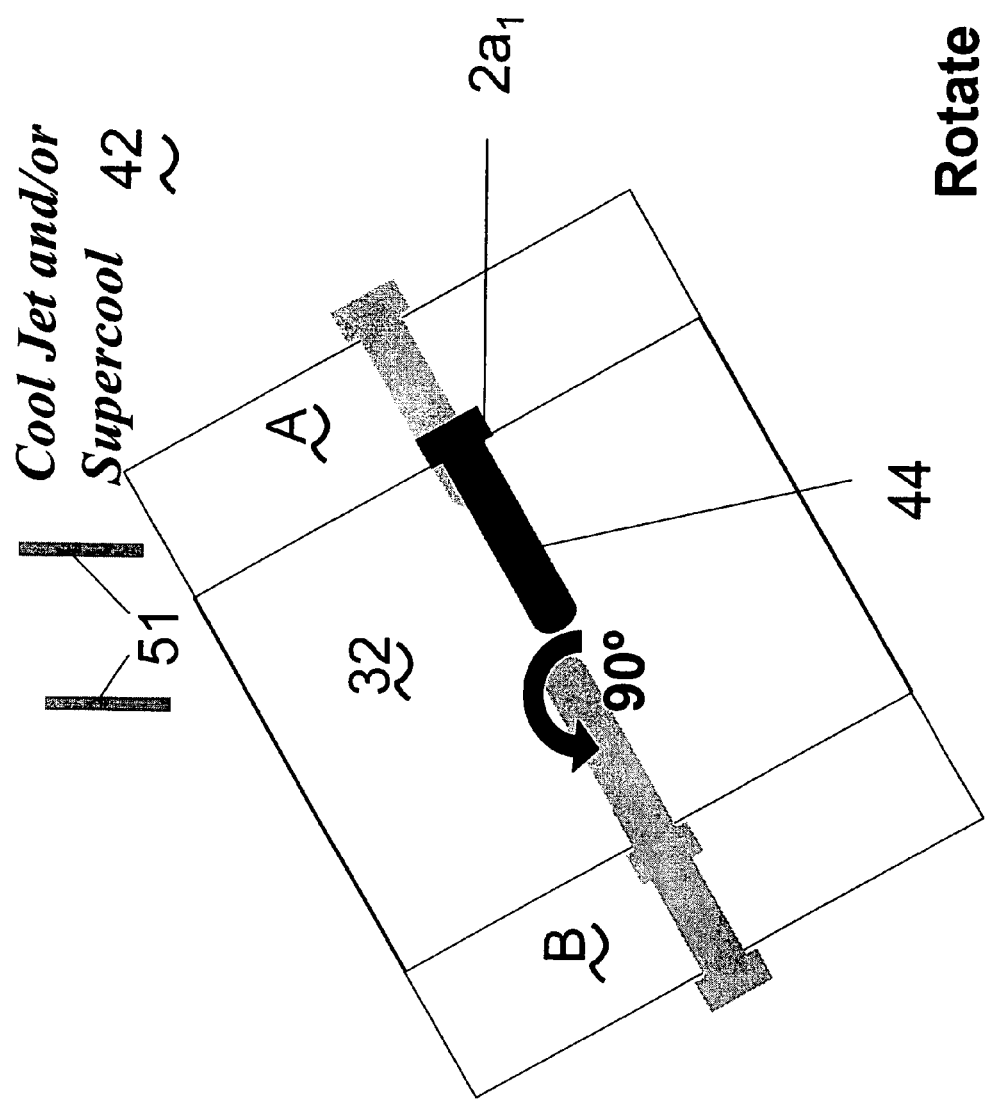
Figure 12C:
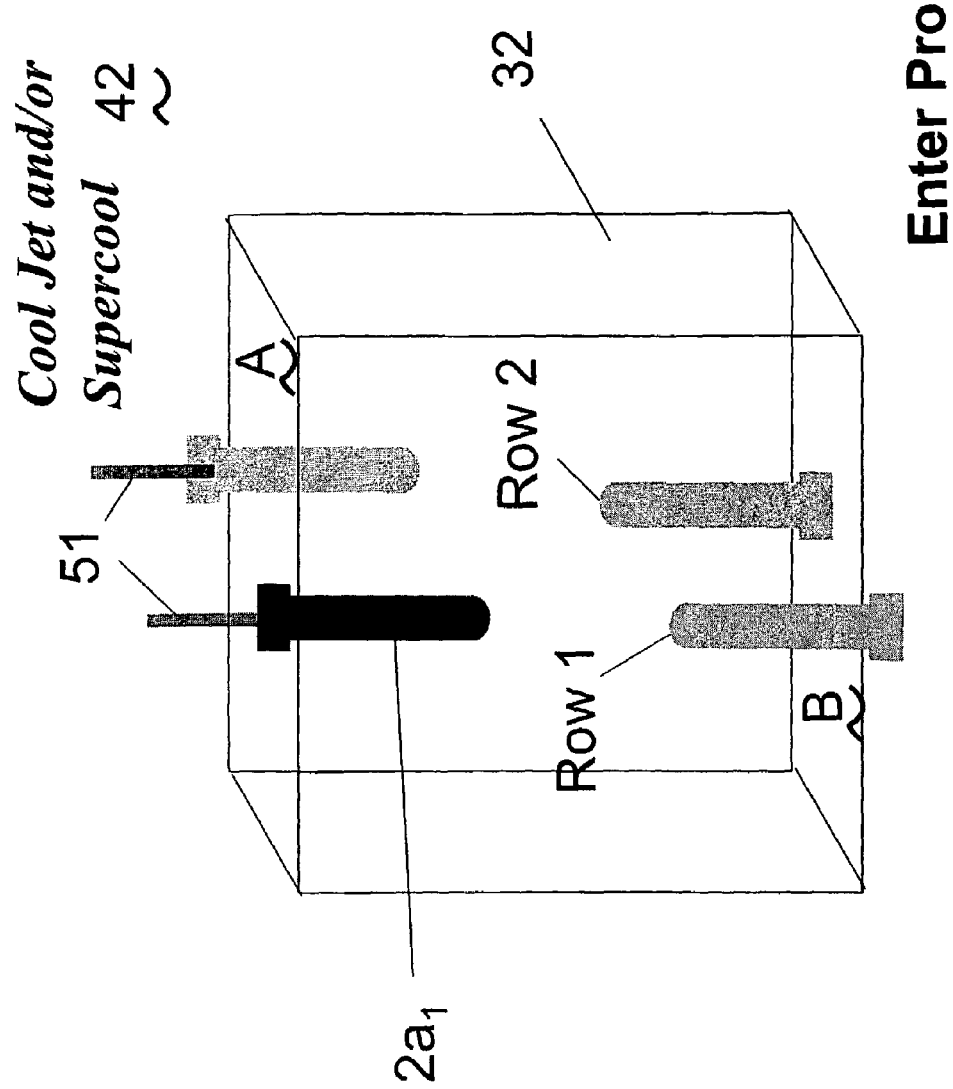
Figure 12D:
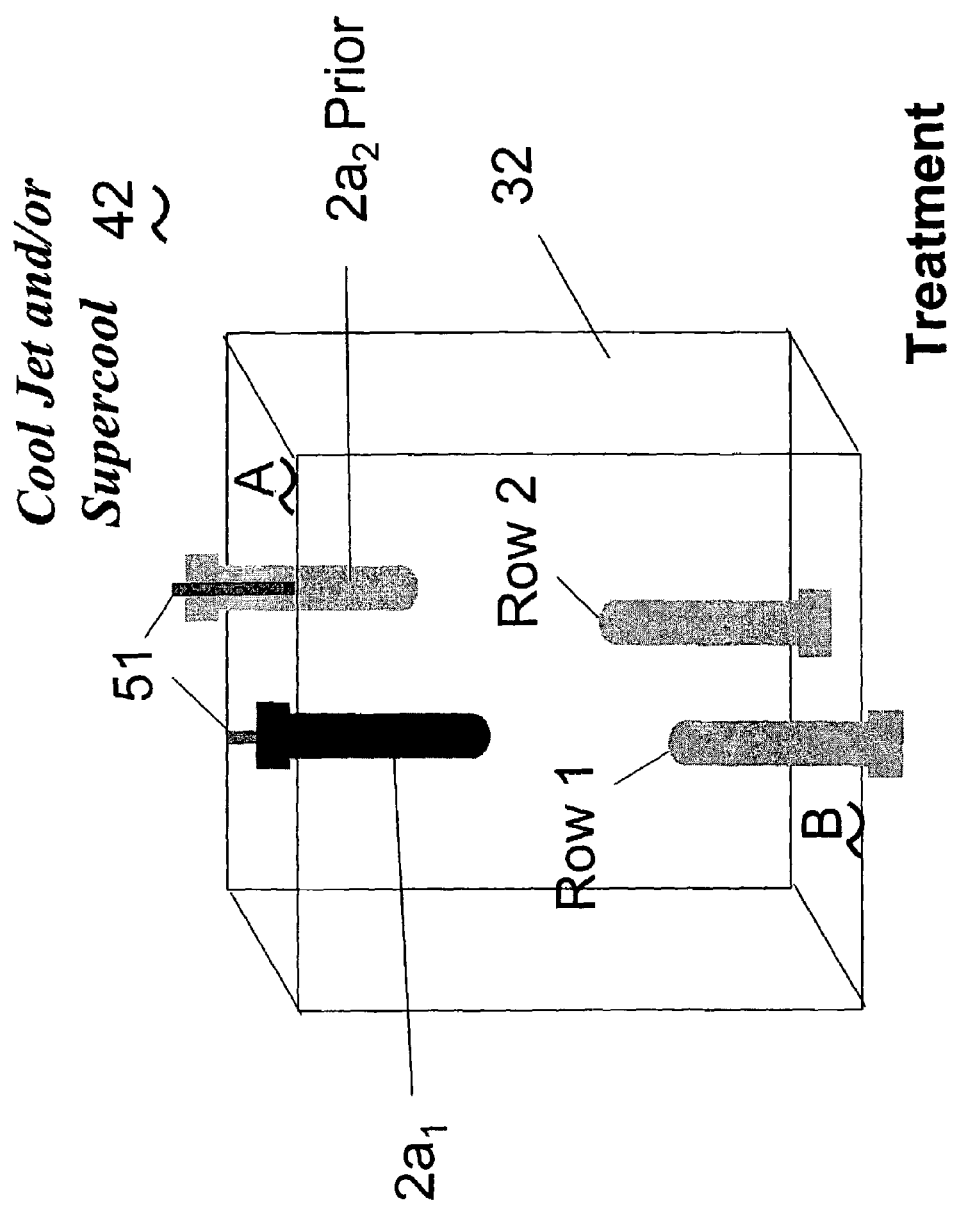
Figure 12E:
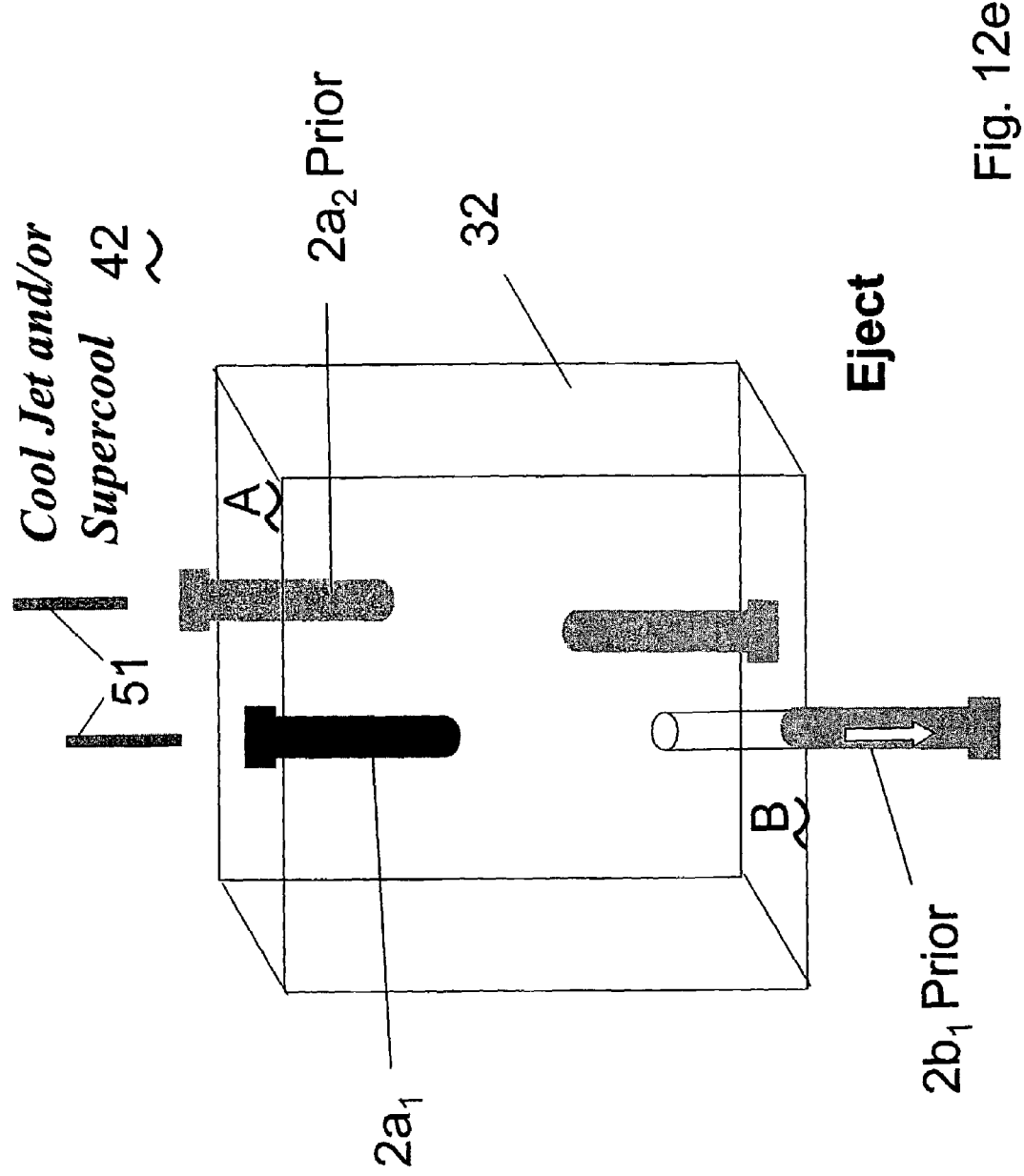
Figure 12F:
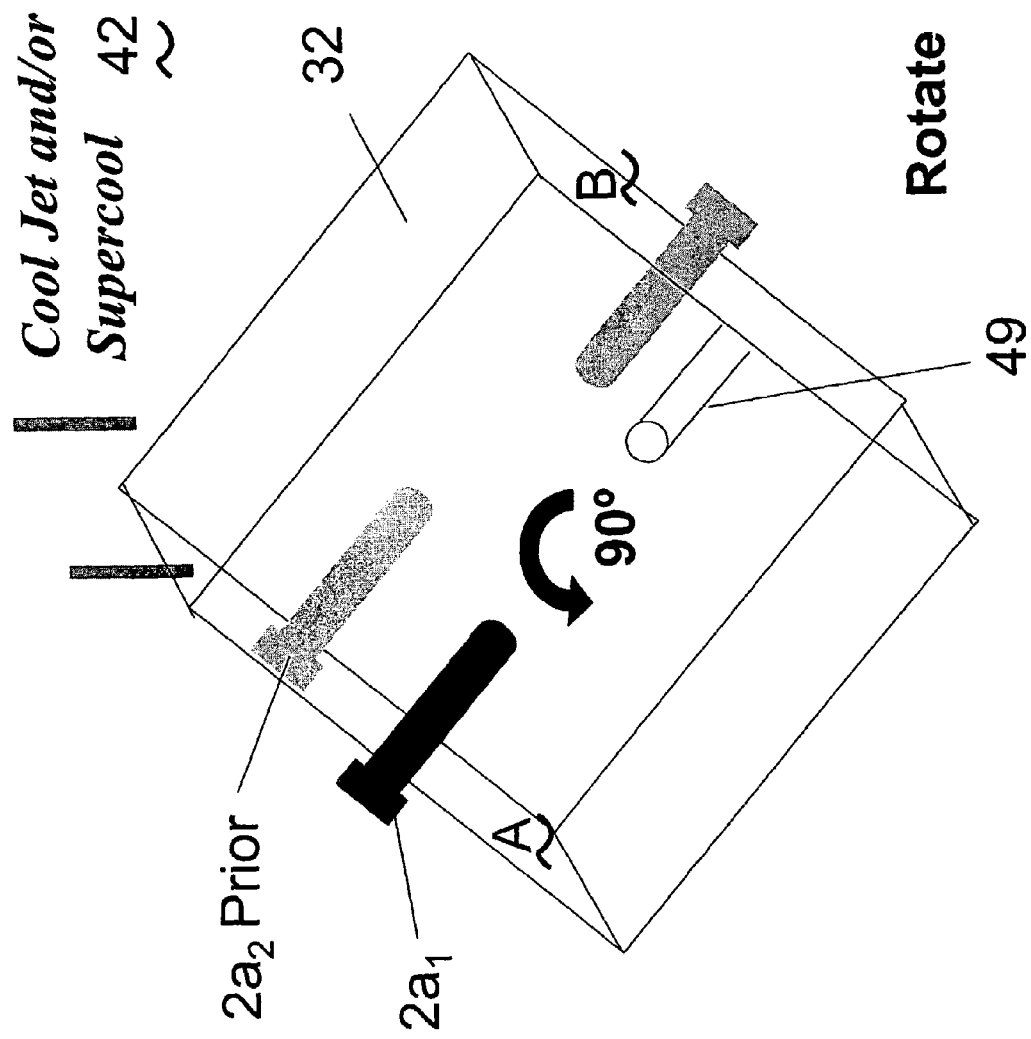
Figure 12G:
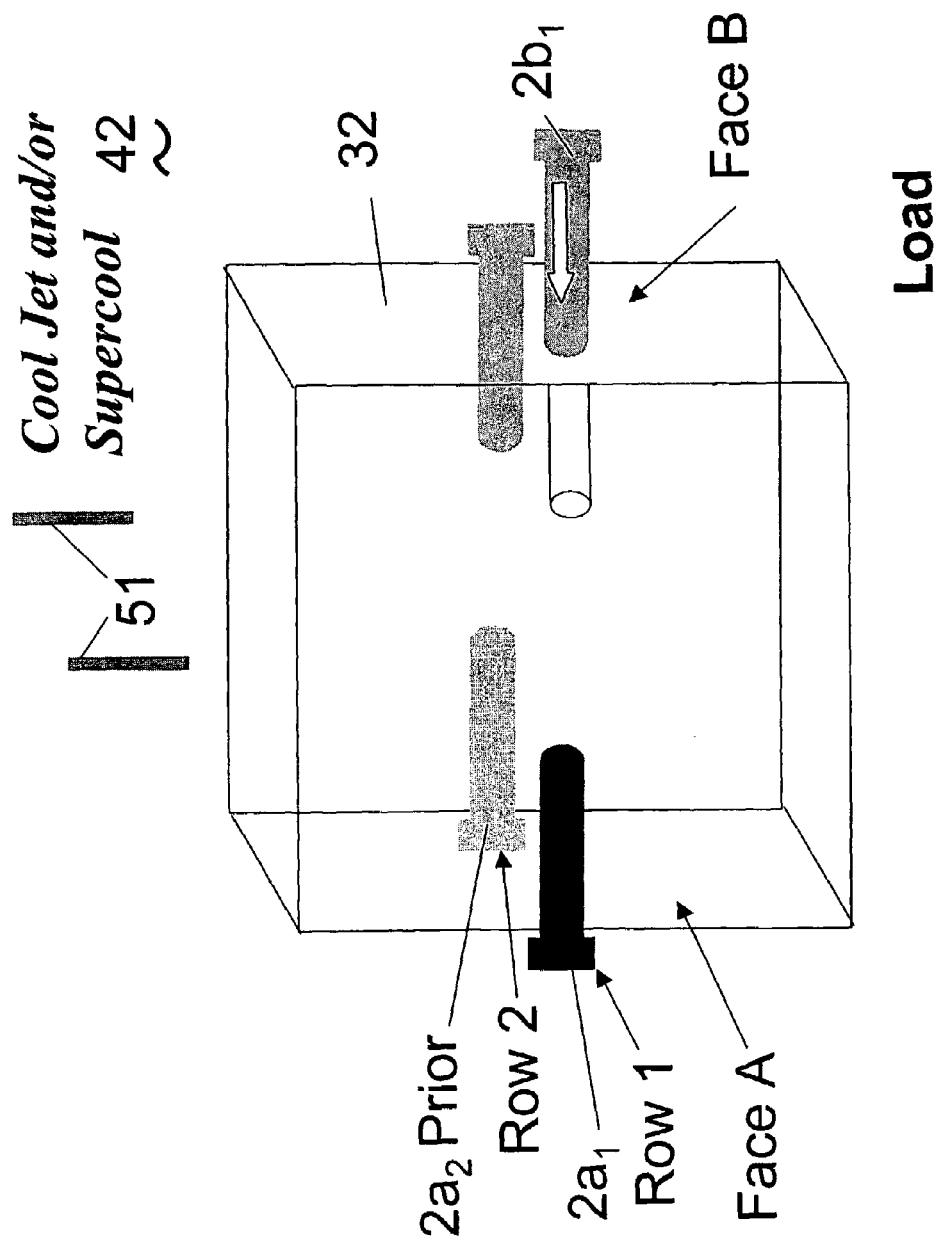
Figure 12H:
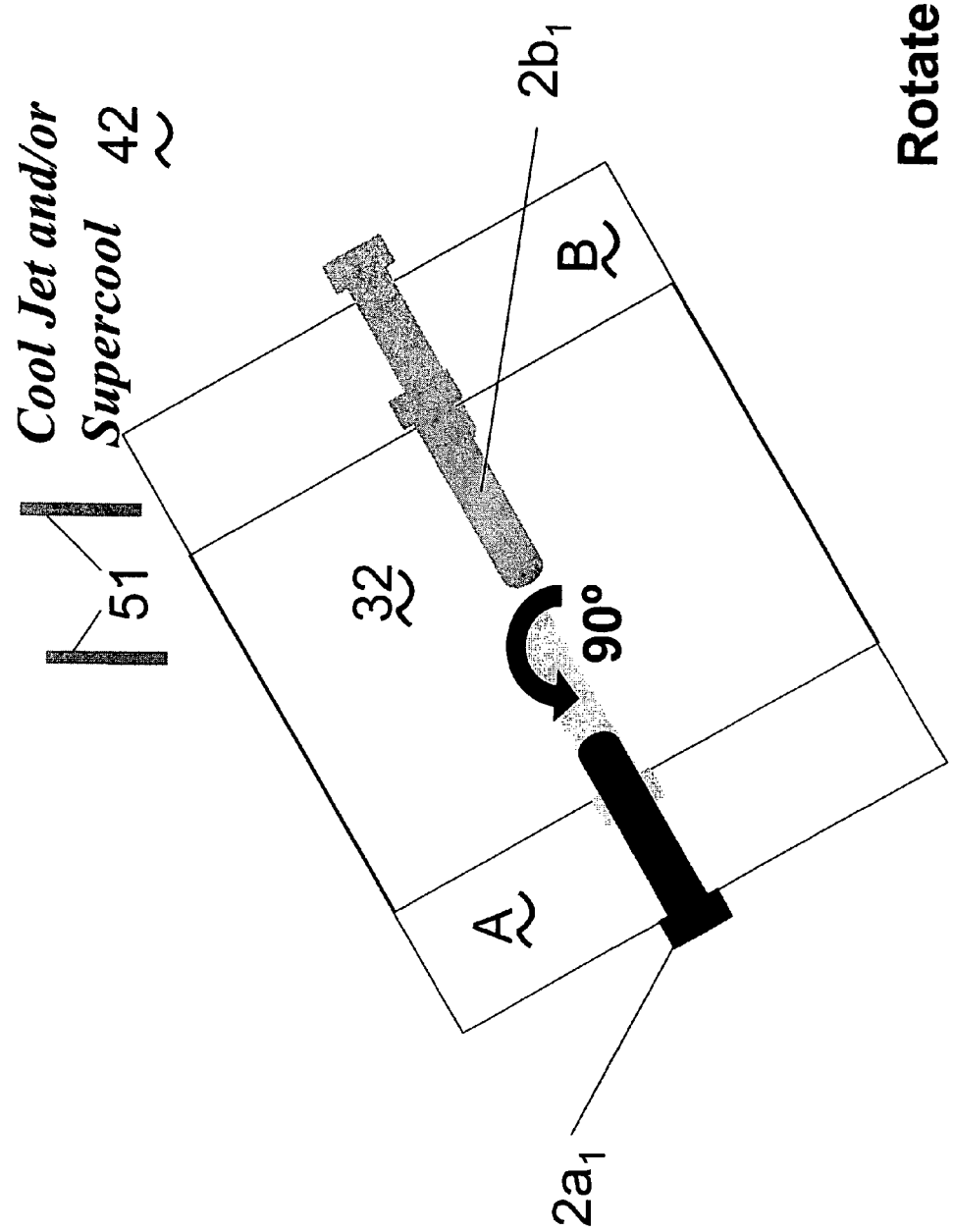
Figure 12I:
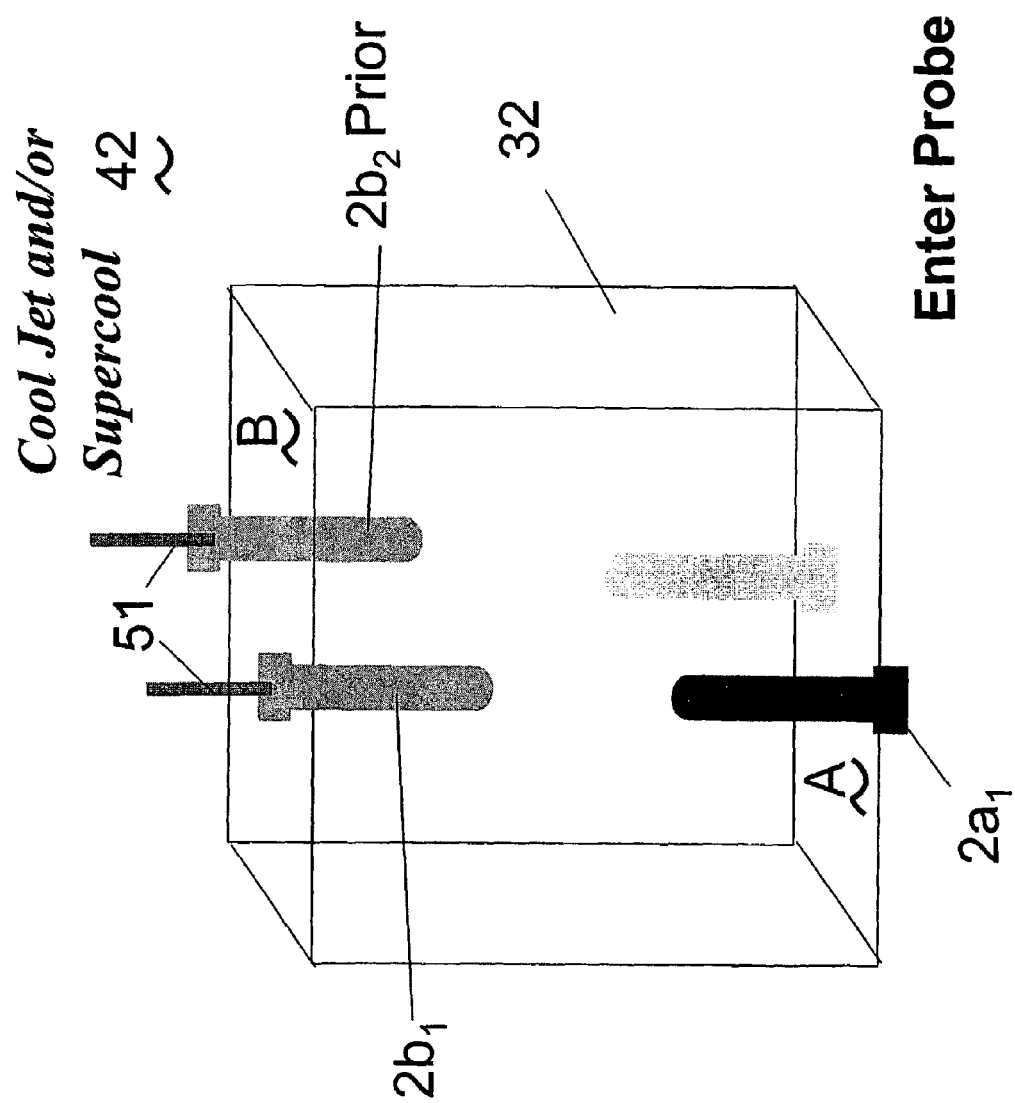
Figure 12J:
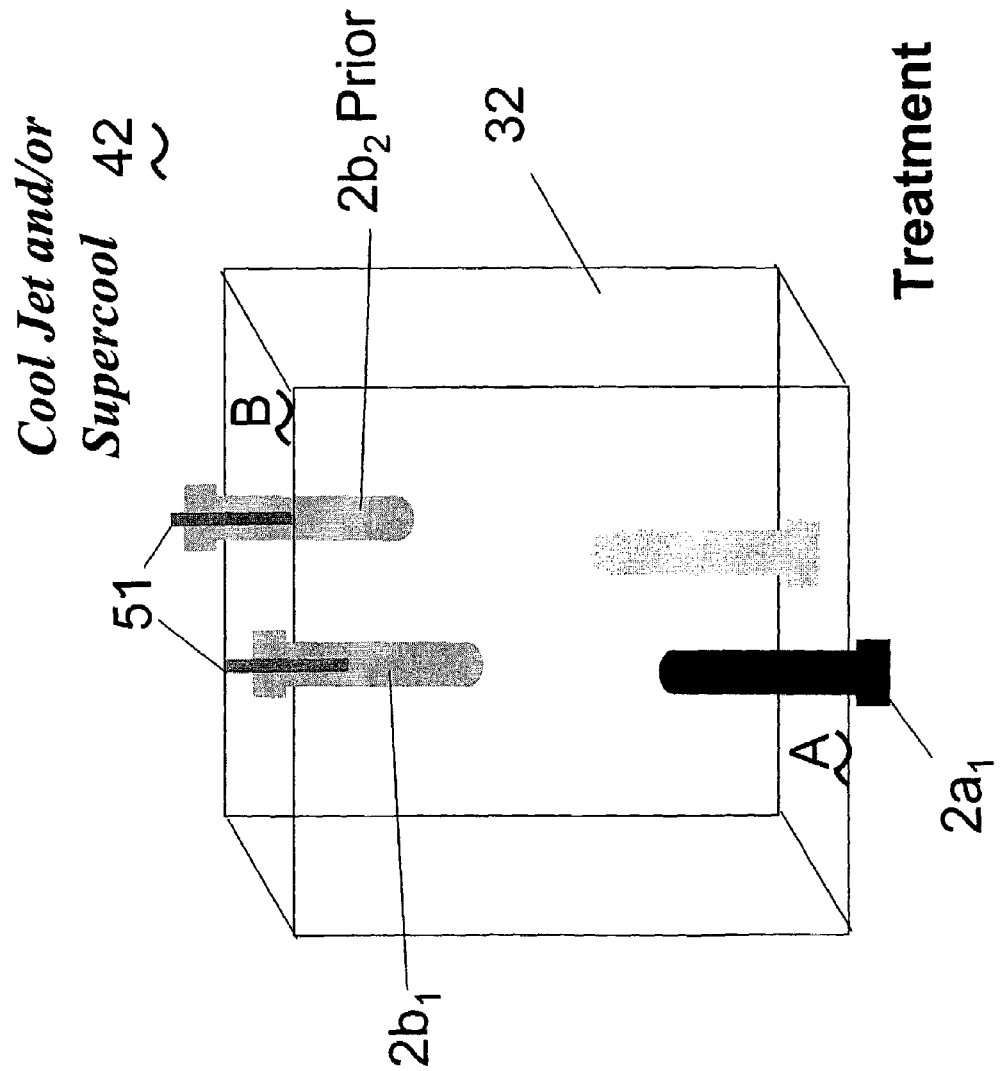
Figure 12K:
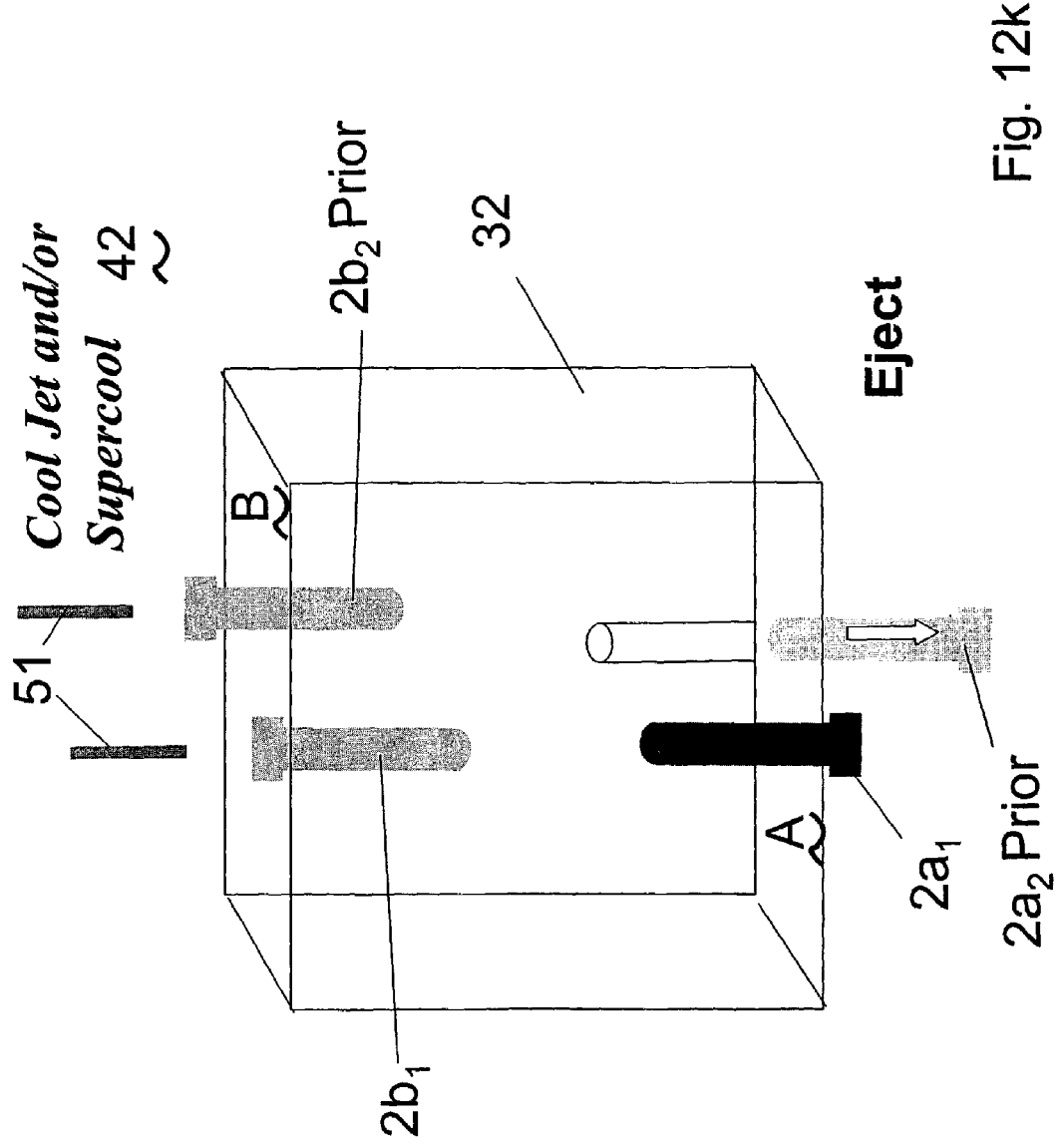

For clarification, FIG. 11 is a sequence chart showing the operations occurring at each stage of the injection molding and cooling cycles. FIGS. 12a–12y schematically depict the structure during various phases of the sequence chart. The sequence chart and schematics will be described with respect to injection molding cycles, cooling turret cycles, and those activities that take place in the molding turret 11 and the cooling turret block 32. The control of the various molding and movement operations may be performed with one or more general purpose computers, PCs, processors, application specific integrated circuits, digital signal processors, hard-wired circuits, motors, servomotors, stepper motors, pressure sensors, temperature sensors, etc.

Injection molding cycle 1 begins when the mold halves close, the clamp is activated, and molten plastic is injected into the mold and held therein for a predetermined period of time. The just-molded articles are allowed to cool in the mold for another predetermined period of time, and the mold halves are opened. The molding turret 11 is then moved away from the mold cavity half and rotated 180 degrees where the cooling fan 60 blows cooling air on the just-molded parts. The molding turret 11 immediately moves back toward the mold cavity half, and injection molding cycle 2 begins, in the meantime the previously molded parts remain on the cores until just before the mold is due to open again. The PMC device 30 is moved toward the molding turret 11 and the parts are transferred to the cooling turret block 32 immediately prior to the mold being opened again.

In the cooling turret block 32, the previously-molded parts $2a_1$ (see FIG. 12a) are loaded into the cooling tubes 44 of row 1 of face A. The cooling turret block 32 is then moved away from the molding turret 11 and rotated 90 degrees toward the CoolJet™/Supercool unit 42 (see FIG. 12b). The CoolJet™/Supercool unit 42 is then moved downward, the cooling pins 51 are inserted into the preforms $2a_1$ (see FIG. 12c), and the preforms are pressurized and/or cooled (see FIG. 12d). Note that the cooling pins 51 also cool preforms $2a_{2\text{-}prior}$, which are preforms from a prior molding cycle located in row 2 of face A (to be described in greater detail below). The preforms $2a_1$ are then vented/blown to complete the cooling engagement, and the cooling unit 42 is moved upward to disengage the cooling pins 51 from the preforms $2a_1$. At the same time, appropriate mechanical and/or pneumatic means are activated to eject the previously-cooled preforms $2b_{1\text{-}prior}$ (from a prior injection molding cycle) from the bottom of cooling turret block 32 (see FIG. 12e). This step occurs approximately midway through injection molding cycle 3.

After the molded preforms 2b have been ejected from the cooling turret block 32, it is rotated 90 degrees (see FIG. 12f) to present the cooling tubes 49 to the molding turret 11. The PMC device 30 is then moved toward molding turret 11, and previously molded preforms $2b_1$ are transferred to the cooling tubes 49 of row 1 of face B (see FIG. 12g). Then, the steps described above with respect to preforms $2a_1$ (see FIGS. 12a–12f) are repeated for preforms $2b_1$ (see FIGS. 12g–12l). During these steps, the preforms $2a_1$ on face A of cooling turret block 32 continue to cool. Note that in FIG. 12k, it is not the above-described preform $2a_1$ which is ejected, but the preform $2a_{2\text{-}prior}$ from a prior injection molding cycle which is ejected from row 2 of face A. This unloading step also occurs approximately midway through injection molding cycle 4. Notably, after the cooling turret block 32 is rotated 90 degrees in FIG. 12l, the cooling turret block 32 is moved axially to present the cooling tubes 44 of row 2 of face A to the molding turret 11.

Figure 12M:
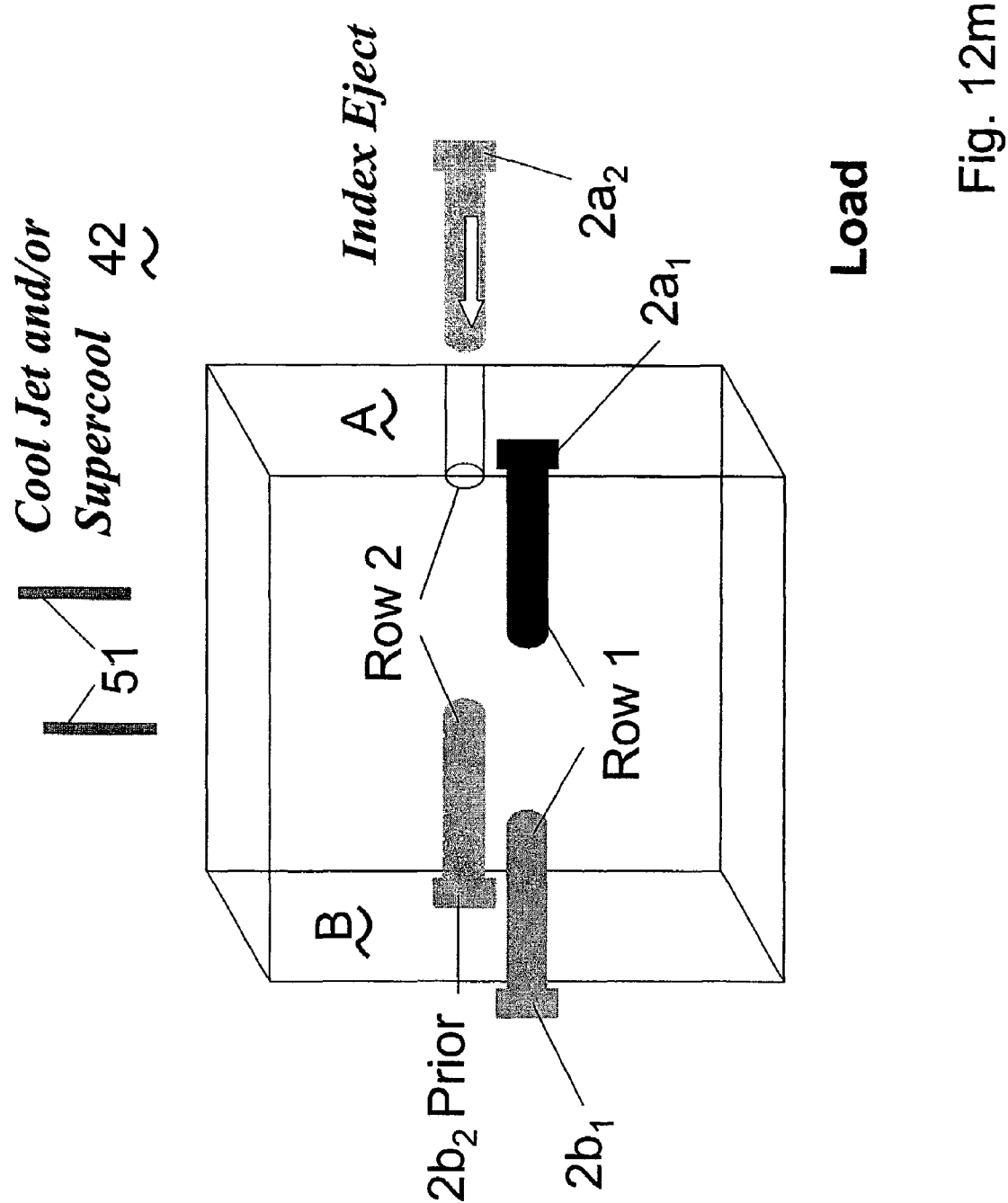
Figure 12N:
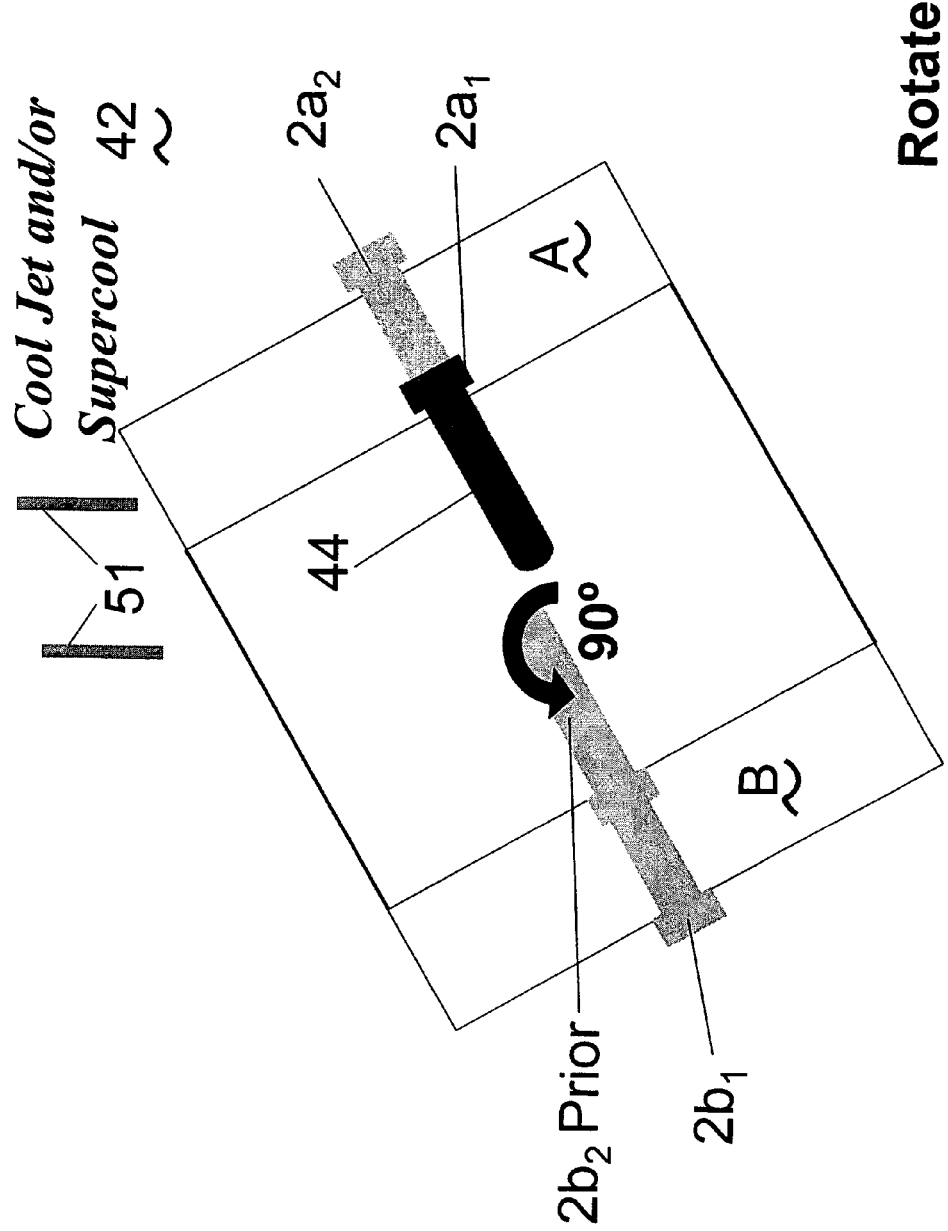
Figure 12O:
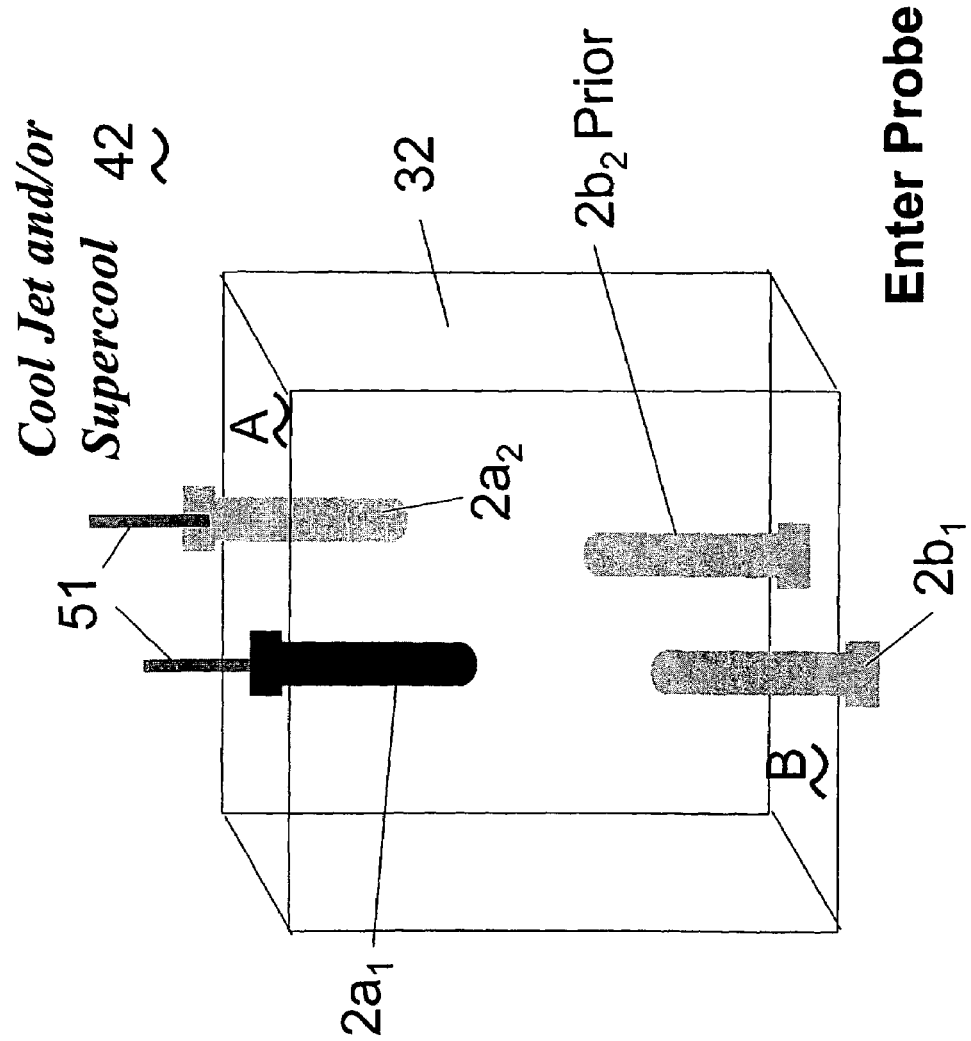
Figure 12P:
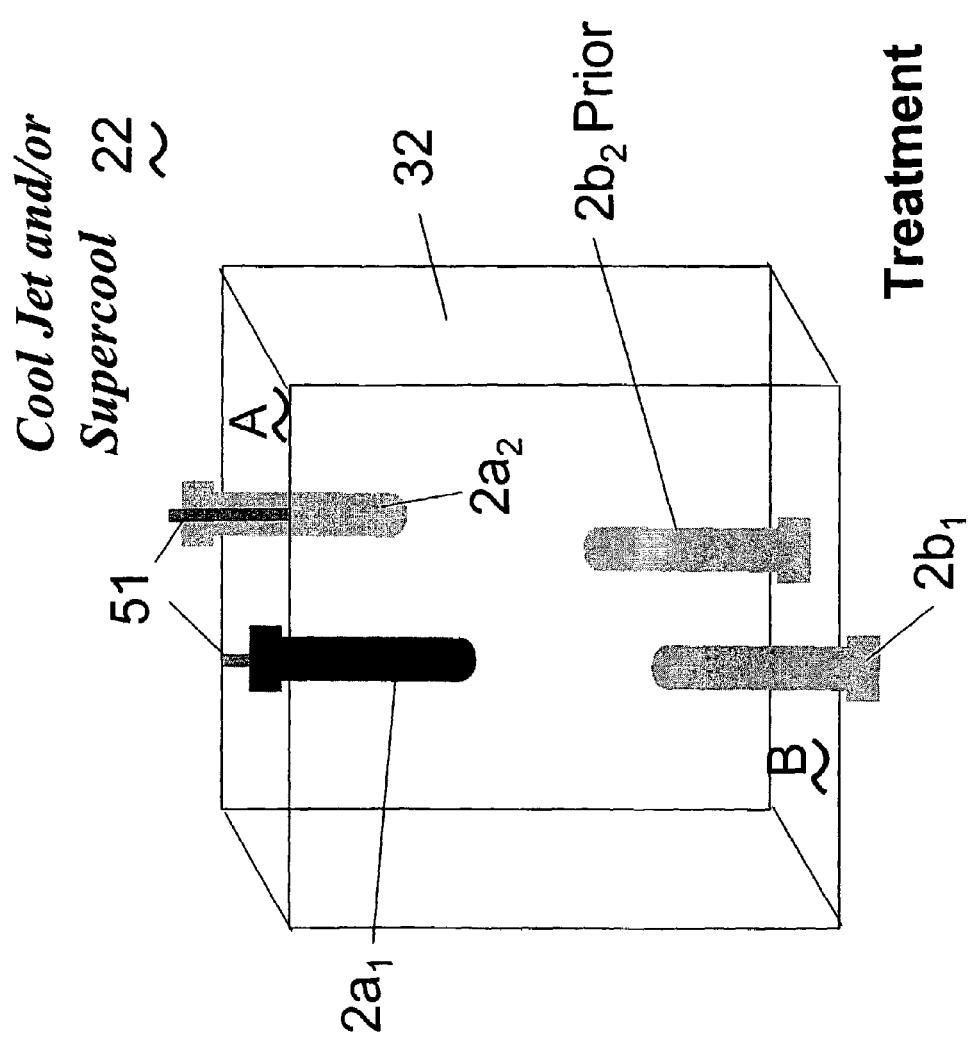
Figure 12Q:
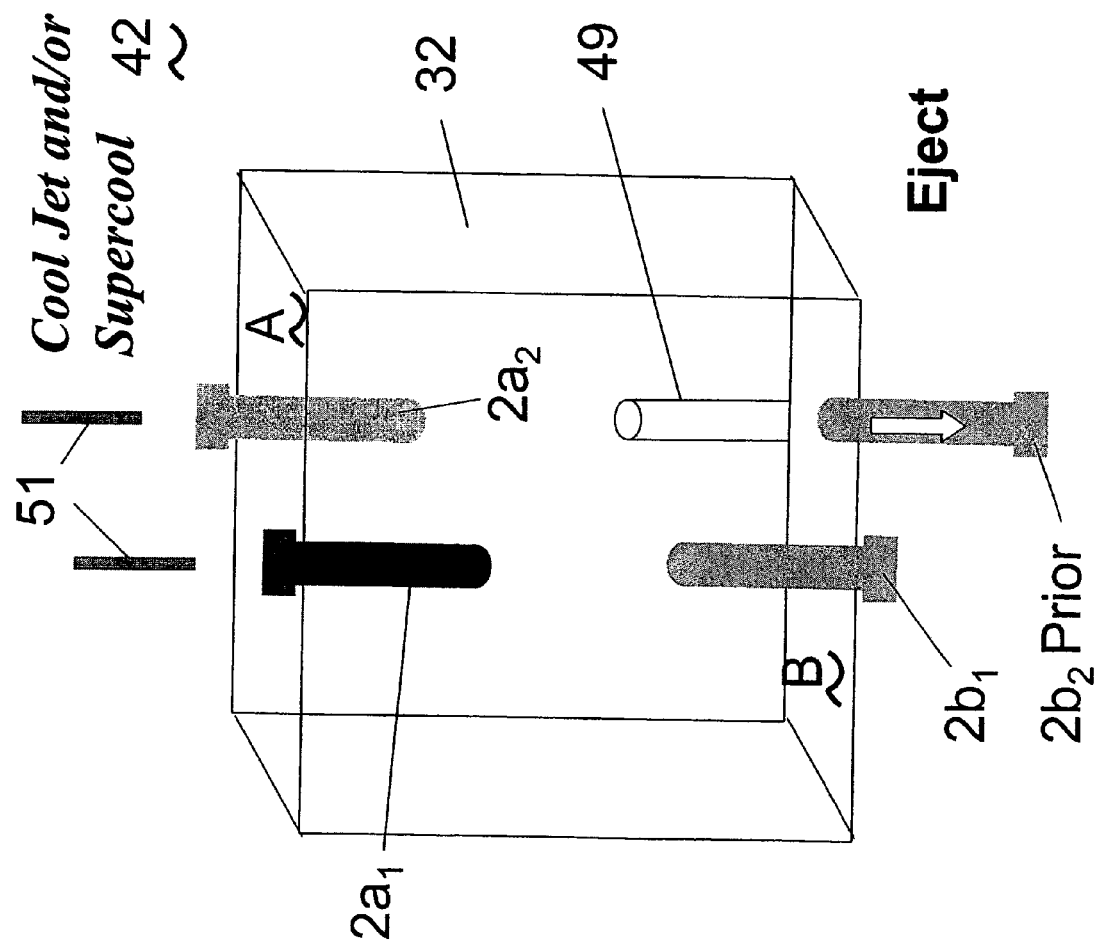
Figure 12R:
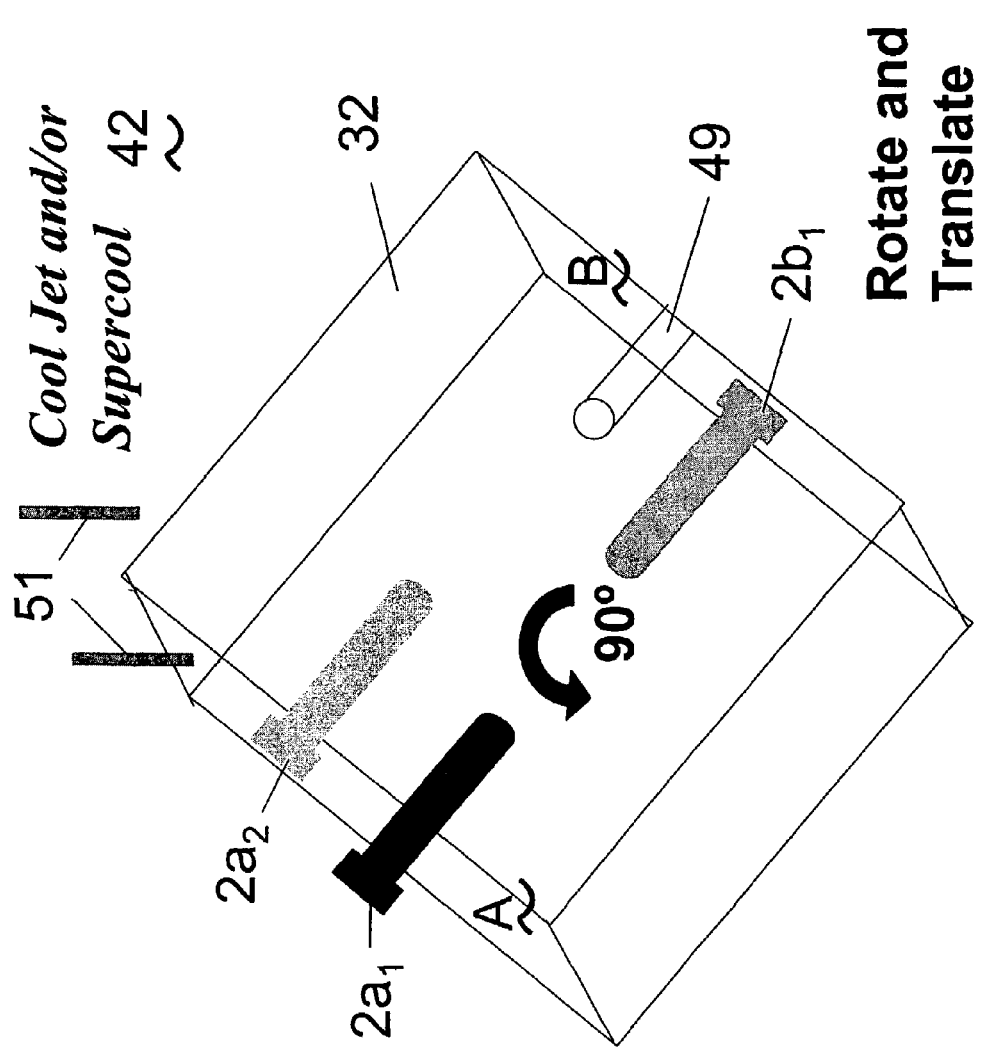

After rotating and axially translating the cooling turret block 32, the PMC device 30 is moved toward the molding turret 11, and preforms $2a_2$ are transferred to the cooling tubes 44 of row 2 of face A of the cooling turret block (see FIG. 12m). Thereafter, the same steps as described above with respect to preforms $2a_1$ (FIGS. 12a–12f) are repeated for preforms $2a_2$ (see FIGS. 12m–12r). Note in FIG. 12p that the cooling pins 51 cool both the preforms $2a_2$ in row 2 of face A, as well as preforms $2a_1$ in row 1 of face A. Thus, the preforms $2a_1$ are cooled twice by the cooling unit 42. Note also that in FIG. 12q, the preforms $2b_{2\text{-}prior}$ are ejected while the preforms $2b_1$ remain in the cooling turret block 32. This step also occurs approximately midway through injection molding cycle 5.

Figure 12S:
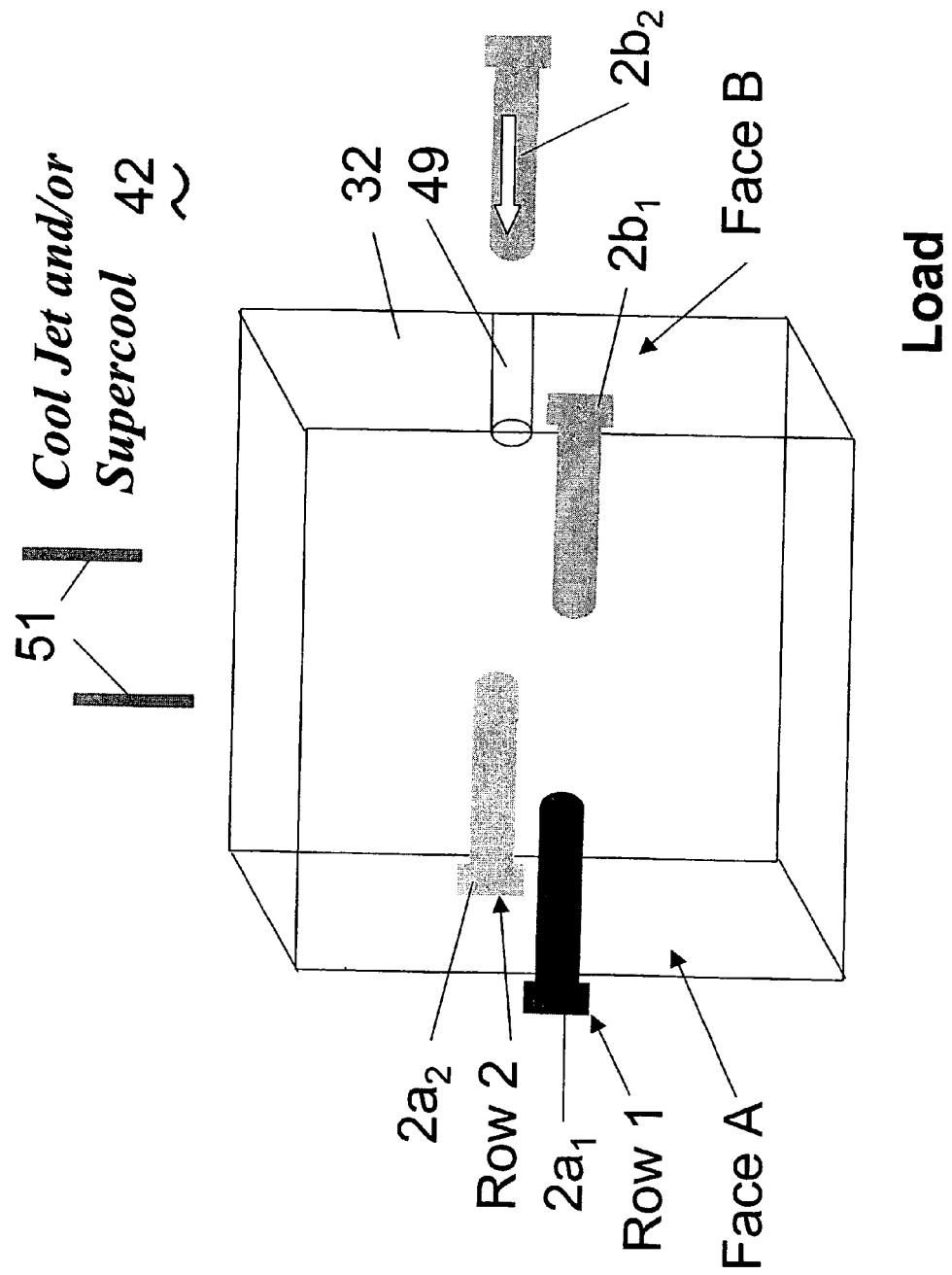
Figure 12T:
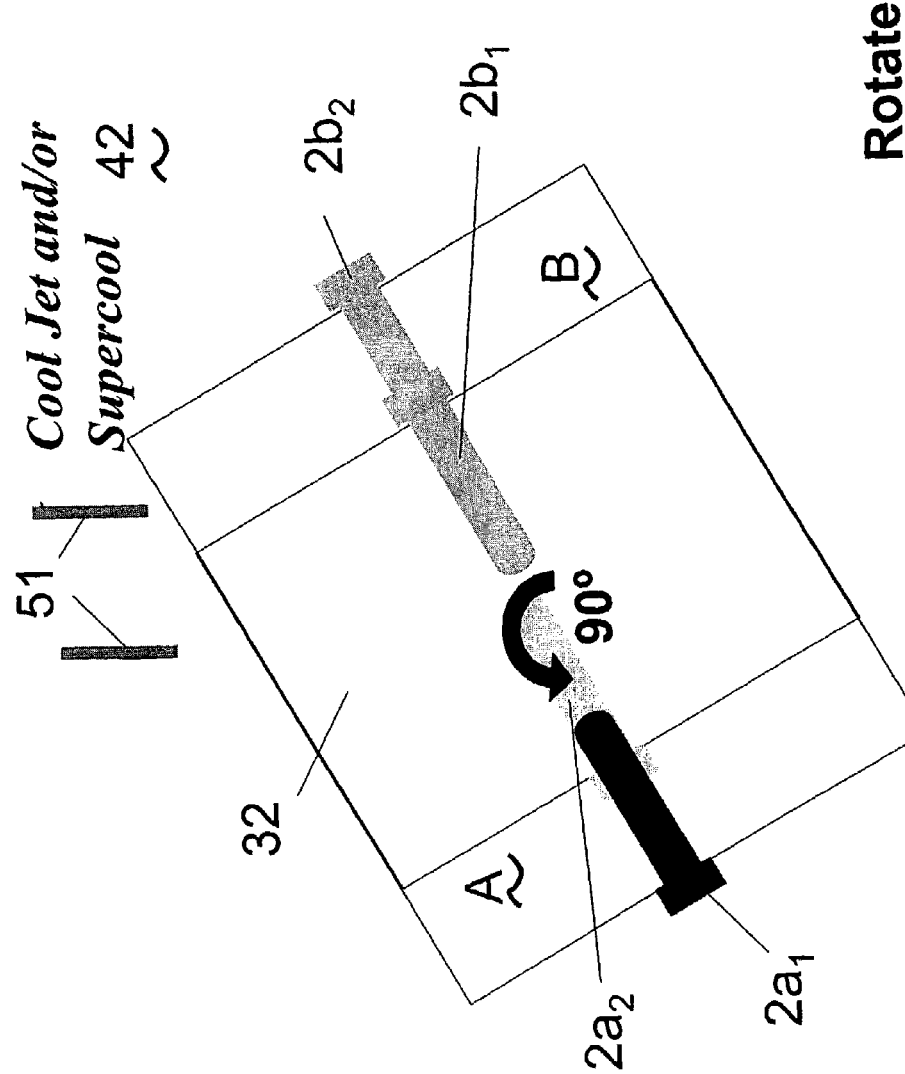
Figure 12U:
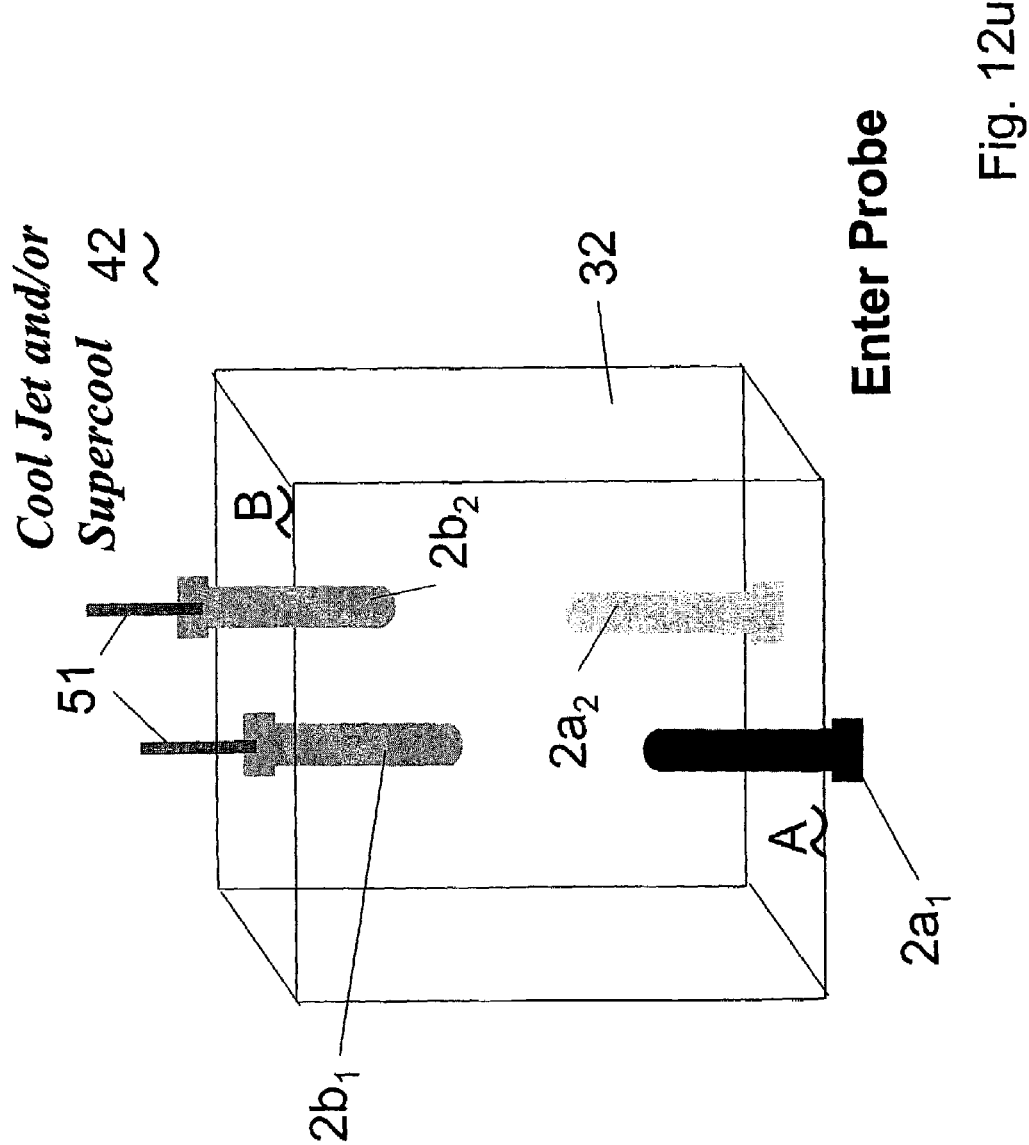
Figure 12V:
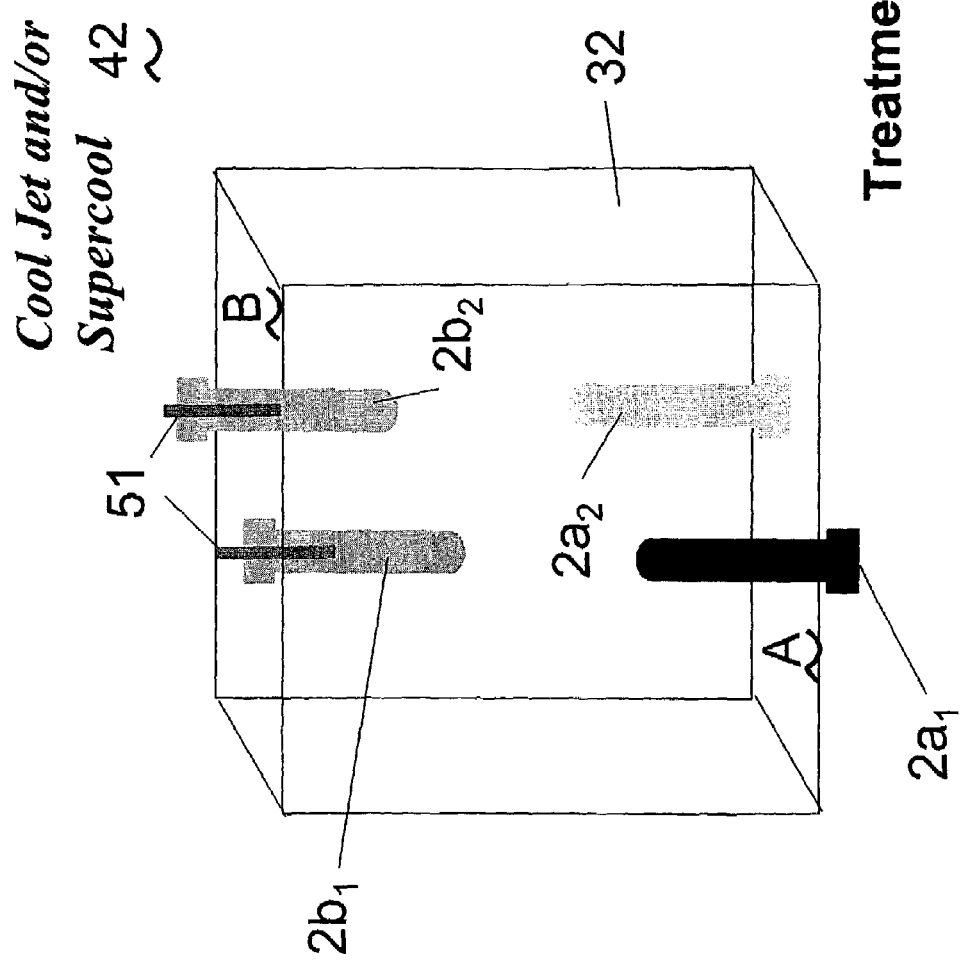
Figure 12W:
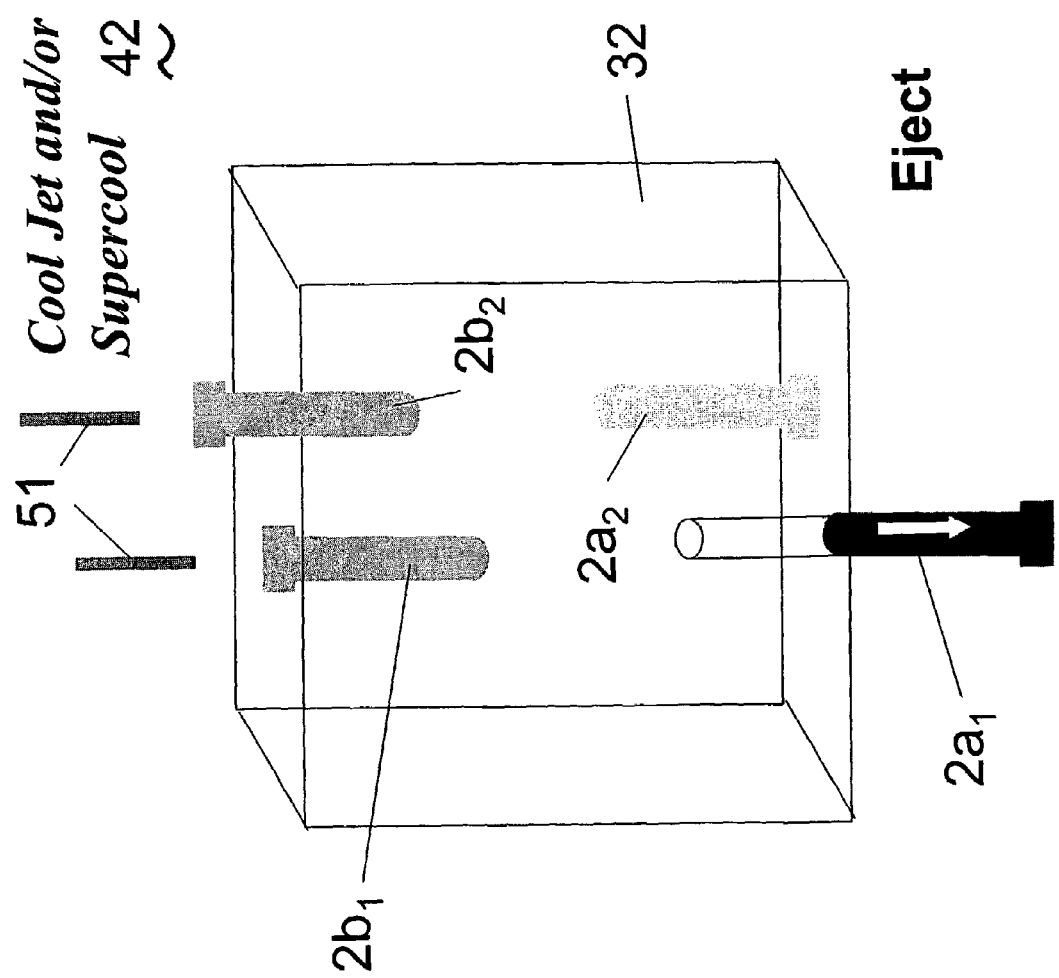
Figure 12X:
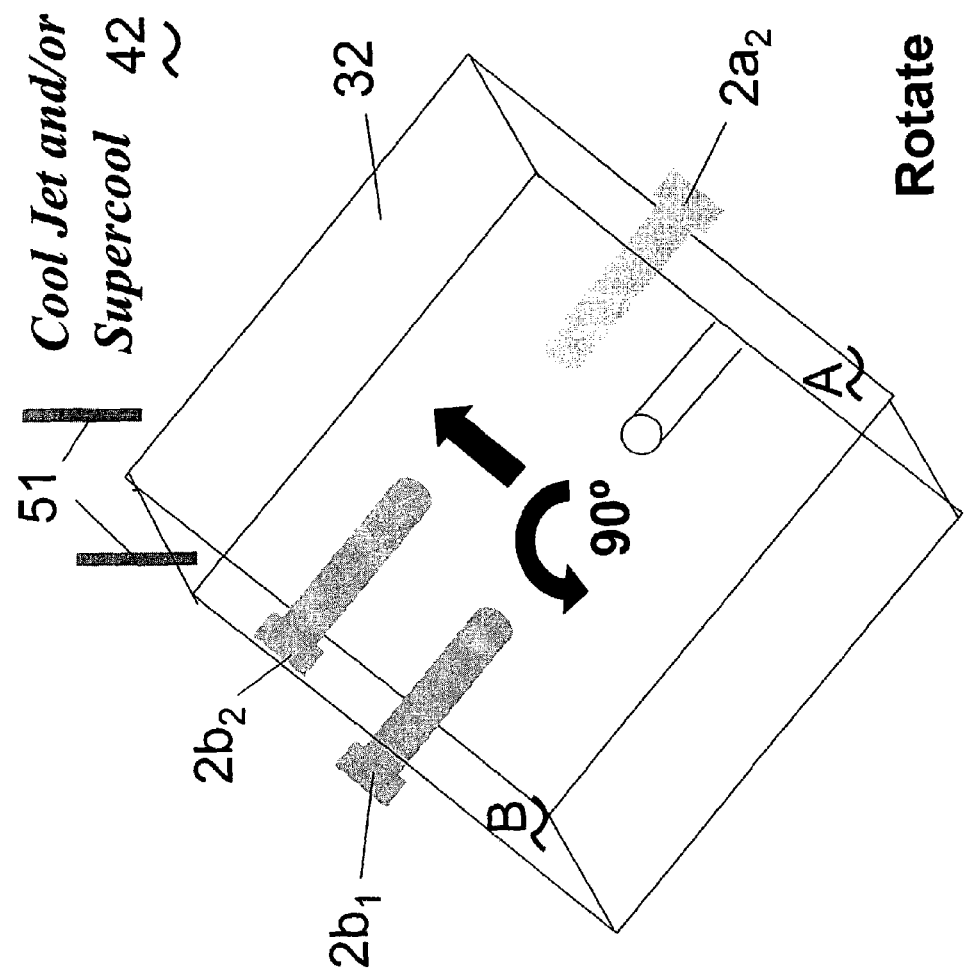
Figure 12Y:
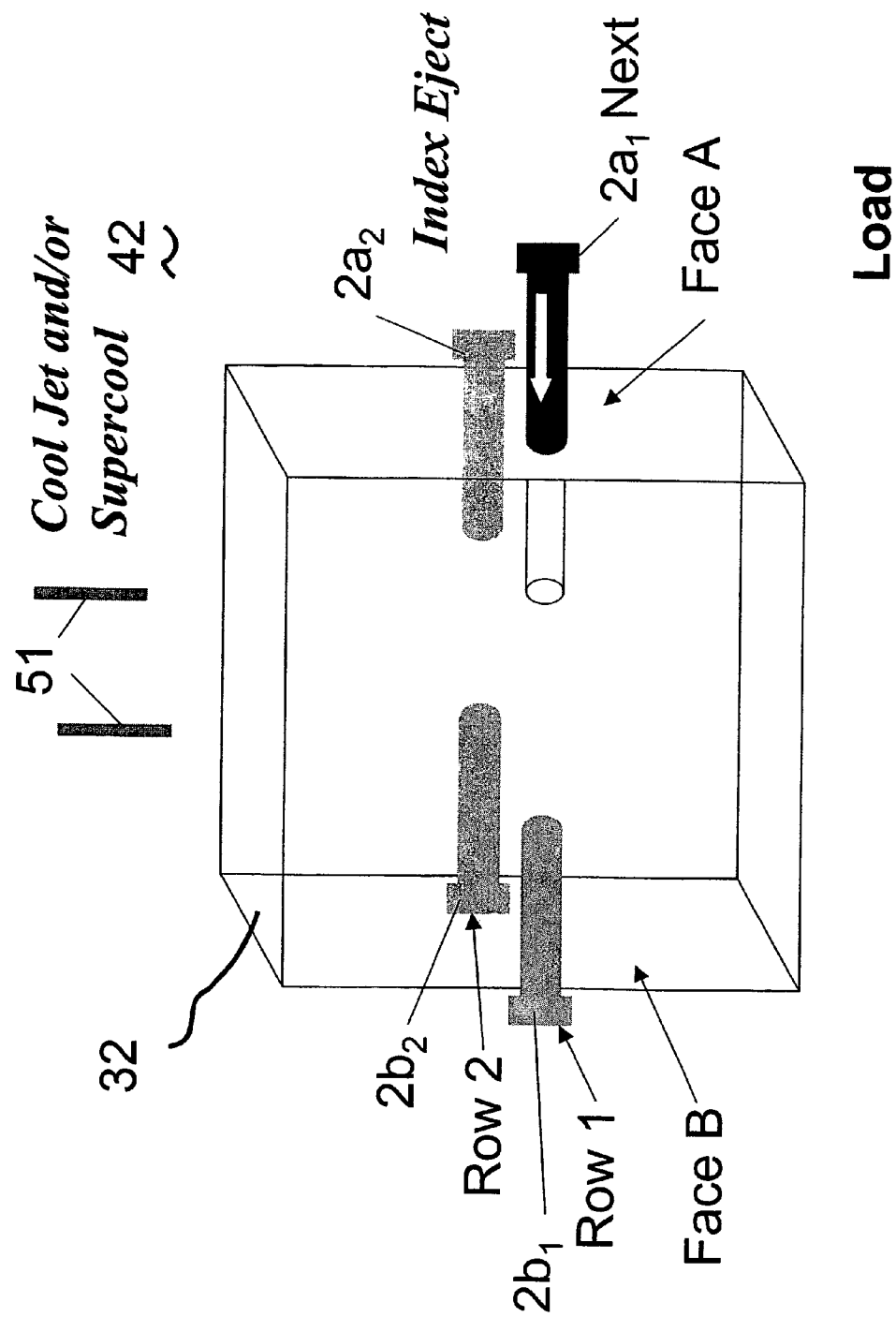

When the cooling turret block 32 has been rotated so that face B is again presented to molding turret 11, the PMC device is moved toward the molding turret 11, and preforms $2b_2$ are transferred to the cooling tubes 49 of row 2 of the cooling turret (see FIG. 12s). Note that preforms $2a_1$, $2a_2$, and $2b_1$ remain in the cooling turret block for additional cooling. Thereafter, the same steps as described above with respect to preforms $2b_1$ (FIGS. 12g–12l) are repeated for preforms $2b_2$ (see FIGS. 12s–12x). In FIG. 12w, preforms $2a_1$ are finally ejected from the cooling turret block 32, during injection molding cycle 6, more than four cycles after their molding, and after rotating one and three-quarters times (630 degrees) around the cooling turret block 32. This extension of the cooling time allows the preforms $2a_1$ to properly solidify without the crystallization problems discussed earlier. In FIG. 12x, the cooling turret block 32 is rotated 90 degrees as well as being moved axially to present the cooling tubes 44 of row 1 of face A to the molding turret 11.

In FIG. 12y, the cooling turret block 32 is in the same position as that depicted in FIG. 12a, and the next set of preforms $2a_{1\text{-}next}$ are loaded into the cooling tubes 44 of row 1 of face A, and the above-described steps are repeated.

The above-described steps thus provide an optimized embodiment in which a minimum amount of injection and PMC tooling components are required in order to produce substantially defect-free high quality preform parts at a fast production cycle. Only one cooling station is used and yet two treatment opportunities are provided to each preform. Note, however, that additional cooling stations could be provided at any one or more of the three other positions to which the faces of the cooling turret block are rotated during the above-described process.

4. Advantageous Features

Advantageous features according to the preferred embodiments include:

- A PMC cooling turret block with translational motion preferably along an axis parallel to its axis of rotation.
- A PMC unit that provides two or more separate and possibly different treatment events for each part.
- A PMC unit that carries a blower unit for projecting a stream of cooling air onto the parts positioned on their cores prior to transfer.

5. Conclusion

Thus, what has been described is a method and apparatus for efficiently cooling molded plastic articles, achieving reduced cycle time and cost.

While the present invention shortens the manufacturing time of blow molded container preforms generally having circular cross-sectional shapes perpendicular to the preform axis, those skilled in the art will realize the invention is equally applicable to other molded products possibly with non-circular cross-sectional shapes, such as, pails, paint cans, tote boxes, and other similar products requiring a similar general configuration and mold design characteristics as with the preform injection mold.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiment.

What is claimed is:

1. An injection molding machine, comprising:
   a mold cavity half having a plurality of mold cavities;
   a mold core half having a plurality of mold cores corresponding to said plurality of mold cavities;
   mold movement structure for causing relative movement between said mold cavity half and said mold core half to cause a plurality of molded articles to be extracted from said plurality of mold cavities during each of a plurality of mold cycles;
   a cooling device movable with respect to said mold core half and having a plurality of cooling tubes to hold the plurality of molded articles extracted from said plurality of mold cavities; and
   cooling device movement structure coupled to said cooling device and configured to maintain the plurality of molded articles in said plurality of cooling tubes for a time period exceeding two of the mold cycles.

2. An injection molding machine according to claim 1, wherein said cooling device movement structure moves said cooling device in a rotary direction and in a direction parallel to an axis of the rotary motion.

3. An injection molding machine according to claim 2, wherein said cooling device has a first row of cooling tubes and an adjacent second row of cooling tubes, and wherein said cooling device movement structure moves said cooling device such that (i) the first plurality of cooling tubes receives a first plurality of molded articles from said mold core half in a first mold cycle, and (ii) the second plurality of cooling tubes receives a second plurality of molded articles from said mold core half in a first mold cycle, said cooling device movement structure moving said cooling device in the direction parallel to the axis of the rotary motion between the first and second mold cycles.

4. An injection molding machine according to claim 3, wherein said cooling device movement structure moves said cooling device in a rotary direction for more than 360 degrees while the first plurality of cooling tubes holds the first plurality of molded articles.

5. An injection molding machine according to claim 4, further comprising a blower configured to blow cooling air onto the first plurality of molded articles before they are received in said first plurality of cooling tubes.

6. An injection molding machine according to claim 5, further comprising a cooling station disposed adjacent said cooling device and configured to supply cooling fluid to an interior of said first plurality of molded articles after said cooling device movement structure rotates said cooling device in a direction away from said mold core half.

7. An injection molding machine according to claim 6, further comprising cooling station movement structure configured to cause relative movement between said cooling device and said cooling station.

* * * * *